US012647791B2

(12) United States Patent     (10) Patent No.:    US 12,647,791 B2
Morchon                          (45) Date of Patent:         Jun. 2, 2026

(54) METHOD AND DEVICE FOR AUTHENTICATING A PRIMARY STATION

(71) Applicant: KONINKLIJKE PHILIPS N.V., Eindhoven (NL)

(72) Inventor: Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 51 days.

(21) Appl. No.: 18/018,897

(22) PCT Filed: Aug. 4, 2021

(86) PCT No.: PCT/EP2021/071708
§ 371 (c)(1),
(2) Date: Jan. 31, 2023

(87) PCT Pub. No.: WO2022/029149
PCT Pub. Date: Feb. 10, 2022

(65) Prior Publication Data
US 2023/0308877 A1     Sep. 28, 2023

(30) Foreign Application Priority Data
Aug. 4, 2020     (EP) ..................................... 20189373
Oct. 1, 2020     (EP) ..................................... 20199594
(Continued)

(51) Int. Cl.
*H04W 12/108*     (2021.01)
*H04L 9/32*       (2006.01)
(Continued)

(52) U.S. Cl.
CPC ......... *H04W 12/108* (2021.01); *H04L 9/3247* (2013.01); *H04W 12/06* (2013.01); *H04W 12/122* (2021.01)

(58) Field of Classification Search
CPC . H04W 12/108; H04W 12/122; H04W 12/06; H04L 9/3247
See application file for complete search history.

(56) References Cited

U.S. PATENT DOCUMENTS 9,853,949 B1     12/2017   Stickle
11,310,208 B1 *   4/2022   Stickle ..................... G06F 1/12
(Continued)

FOREIGN PATENT DOCUMENTS

WO         2018140204 A1     8/2018

OTHER PUBLICATIONS

3rd Generation Partnership Project: Technical Specification Group Services and System Aspects Study of 5G Security Enhancement Against False Base Stations, No. 9.0 May 29, 2020 (Year: 2020).*
(Continued)

*Primary Examiner* — Amir Mehrmanesh
*Assistant Examiner* — Forrest L Carey

(57)     ABSTRACT

The present invention relates to a method for a secondary station to obtain a time reference in a cellular network in order to verify the freshness of received messages. The method comprises the steps of receiving a plurality of system information, SI, messages from a plurality of primary stations, said SI messages including each a respective time reference information related to the corresponding primary station, checking the validity of a received signature for each of the primary stations, checking a cell identifier for each of the primary stations with a valid signature, and ignoring time reference information from primary stations with a cell identifier being identical to another primary station and having an earlier value than the one from the other primary station, and deducing a local time reference from one or more of the time reference information originating from primary stations with a valid signature.

14 Claims, 15 Drawing Sheets

(30)      Foreign Application Priority Data

| Oct. 12, 2020 | (EP) | ..................................... | 20201320 |
| Oct. 14, 2020 | (EP) | ..................................... | 20201744 |
| Jan. 6, 2021 | (EP) | ..................................... | 21150371 |
| Jan. 8, 2021 | (EP) | ..................................... | 21150643 |
| Jan. 11, 2021 | (EP) | ..................................... | 21150840 |
| Jan. 15, 2021 | (EP) | ..................................... | 21151731 |
| Mar. 11, 2021 | (EP) | ..................................... | 21162091 |
| May 5, 2021 | (EP) | ..................................... | 21172331 |
| May 28, 2021 | (EP) | ..................................... | 21176514 |
| Jun. 8, 2021 | (EP) | ..................................... | 21178146 |

(51)   Int. Cl.
     *H04W 12/06*        (2021.01)
     *H04W 12/122*     (2021.01)

(56)      References Cited

U.S. PATENT DOCUMENTS

2015/0304060 A1 * 10/2015 Xiao ........................ H04L 45/68
                                                     370/503

2017/0295489 A1    10/2017 Agiwal et al.
2021/0051569 A1 *   2/2021 Arjona .................. H04W 72/53
2022/0303923 A1 *   9/2022 Kai ..................... H04W 56/001

OTHER PUBLICATIONS

3rd Generation Partnership Project: Technical Specification Group Services and System Aspects Study of 5G Security Enhancement Against False Base Stations No. 9.0 May 29, 2020.
Cablelabs et al Deligated Digital Signaling for Mitigating False Base Stations vol. SAWG3 May 21, 2020.
International Search Report and Written Opinion From PCT/EP2021/071708 Mailed Nov. 2, 2021.
Bonati et al "Steallte: Private 5G Cellular Connectivity as a Service With Full-Stack Wireless Steganography" IEE Conf. on Computer Communications (2021).
Giordani et al "A Tutorial On Beam Management for 3GPP NT at MM Wave Frequencies".
Hussain et al "Insecure Connection Bootstrapping in Cellular Networks: the Root of All Evil" WISEC '19 May 15-19, 2019.
3GPP TR 33.809. Study on 5G Security enhancements against False Base Stations (FBS) (Sep. 2023).

* cited by examiner

METHOD AND DEVICE FOR AUTHENTICATING A PRIMARY STATION

CROSS REFERENCE TO RELATED APPLICATIONS

This application is a U.S. national phase application of International Application No. PCT/EP2021/071708 filed on Aug. 4, 2021, which claims the benefit of EP Application Serial No. 20189373.2 filed on Aug. 4, 2020 and EP Application Serial No. 20199594.1 filed on Oct. 1, 2020 and EP Application Serial No. 20201320.7 filed on Oct. 12, 2020 and EP Application Serial No. 20201744.8 filed Oct. 14, 2020 and EP Application Serial No. 21150371.9 filed on Jan. 6, 2021 and EP Application Serial No. 21150643.1 filed on Jan. 8, 2021 and EP Application Serial No. 21150840.3 filed on Jan. 11, 2021 and EP Application Serial No. 21151731.3 filed Jan. 15, 2021 and EP Application Serial No. 21162091.9 filed on Mar. 11, 2021 and EP Application Serial No. 21172331.7 filed on May 5, 2021 and EP Application Serial No. 21176514.4 filed on May 28, 2021 and EP Application Serial No. 21178146.3 filed on Jun. 8, 2021 and are incorporated herein by reference.

FIELD OF THE INVENTION

The present invention relates to the field of wireless communications, and in particular to security aspects of the communication between a primary station, e.g. a base station, and a secondary station, e.g. a terminal or a mobile station forming a network. Other entities may be present in such a network, such a security entity.

BACKGROUND OF THE INVENTION

In wireless networks, terminals connect to the network in order to exchange data. Security is crucial in particular for wireless devices where a physical interaction is not required to access the network. Wireless networks must thus implement some measures to be able to exclude devices that are not authorized in the network.

A conventional attack includes an attacker to impersonate an entity of the wireless network, and in particular the primary station, or base station. Thus, many countermeasures are aimed authenticating the identity of the various entities of the network.

3GPP is the organization in charge of the standardization of global solutions for mobile telecommunication systems. The telecommunication systems being developed in the 3GPP partnership are no exception. In particular, in 5G, security measures are under discussions to reinforce the security of the network.

In these telecommunication systems illustrated on FIG. 1, secondary stations 100 act as terminals or end devices (also referred to as User Equipment, UE, in 5G). The secondary station can access different types of services including voice and data services through primary stations 110 acting as base stations (also referred to as gNB in 5G) that are deployed in field. Each primary station 110 serves and communicates with the secondary stations 100 present in an area, also referred as a cell 111. The primary stations are connected to a core network (CN) 120—managed by a network operator—that controls the telecommunications systems and orchestrates the delivery of services.

As mentioned above, an attackers may impersonate network entities such as the primary station by using "False" base stations (FBS) to attack the secondary stations in many ways. A FBS behaves as a proper primary station managed by the network operator and aims at attracting UEs with different goals such as:

perform DoS attacks, obtain private user data, perform Man in the Middle (MitM) attacks and subsequent attacks (e.g. aLTEr, imp4gt, network misconfiguration, . . . ), Perform authentication relay attacks;

Perform Self-Organizing Networks poisoning attacks,

Send fake public warning information.

In Annex E of the 3GPP TS 33.501 it already described how the network can use information sent in measurement reports in RRC_CONNECTED mode to perform "UE-assisted network-based detection of false base station".

One of the solutions currently discussed by 3GPP consists in the implementation of a Signature Generator 121 as part of a Digital Signing network Function (DSnF) that will be part of the Core Network 120 and that will allow to protect the broadcast messages. It aims in particular at ensuring the source authentication. Thus, as shown in FIG. 2, when a primary station 110 has to broadcast system information, it sends a request 201 to the Core Network 120, which transfers a corresponding request 202 to the Signature Generator 121. The Signature Generator 121 then compute a corresponding signature in 203 and provides the primary station 110 through the Core Network 120 with the signed messages 204 to that will be broadcasted at a later point of time 205.

3GPP is currently studying the FBS issue and discussing different solutions. One of the solutions that is receiving more attention and support consists in the implementation of a Digital Signing network Function DSnF) that will be part of the CN and that will allow to protect the broadcast messages (source authentication). When a gNB has to broadcast system information, it sends a request to the DSnF that provides the gNB with the signed messages that will be broadcasted at a later point of time.

In a network like in 5G, the overall proposed process for a UE is thus as follows:

i) scan frequencies, ii) remove or ignore configuration messages such as system information (SI) messages with duplicated PCI (Physical Cell Identifier), i.e. that exhibit the same cell identifier, meaning that at least one of them is False Base Station, iii) acquire the configuration messages (e.g. MIB/SIBs), iv) check the signatures associated with the configuration messages, v) check whether a time marker shows that the message was indeed sent recently to decide on the freshness of the message. This is useful for the case of messages originated by real primary station but repeated or relayed (usually once tampered with) by False Base stations, and vi) if a UE does not have a notion of time or if the freshness check fails, use information from multiple cells to check time consistency.

However, this protocol exhibits some weaknesses which can be used by attackers. In particular, it is possible to exploit one of the countermeasures against the system. For example, if an attacker uses a plurality of False Base Stations having the same identifiers (e.g. PCI) as the real Base Stations, both the real and the FBS would be excluded. It would then suffice for the attacker to add another FBS with a different identifier and that would be the only available option for the UE in the cell. Such a UE would then uses the wrong information provided by the FBS, such as an incorrect time that would render useless the freshness checks once in operation.

SUMMARY OF THE INVENTION

One aim of the present invention is alleviate the above mentioned problems.

Another aim of the present invention is to provide with a method which allows to increase the difficulty for attackers to access or impersonate an entity of the network.

Still another aim of the invention is a secondary station which is able to detect a false base station to ignore its messages.

Thus, in accordance with a first aspect of the invention, it is proposed a method as claimed in claim 1 for a secondary station to obtain a time reference in a cellular network. In accordance with this first aspect, the method comprises the steps of receiving a plurality of system information, SI, messages from a plurality of primary stations, said SI messages including each a respective time reference information related to the corresponding primary station, checking the validity of a received signature for each of the primary stations, checking a cell identifier for each of the primary stations with a valid signature, and ignoring time reference information from primary stations with a cell identifier being identical to another primary station and having an earlier value than the one from the other primary station, and deducing a local time reference from one or more of the time reference information originating from primary stations with a valid signature.

Thus, by not removing the configuration messages originated from primary station having the same identifier before the signature verification, it allows to first exclude any False Base Station that would use already existing identifiers. It is thus no more possible for the attackers to cause the secondary station to exclude real primary station by this check. As a result, this enables the secondary station to obtain the correct timing information required for the freshness checks once in operation in the network.

In a first variant of the first aspect, the time reference information is at least one of the following: a time offset representative of the difference between a clock value at the primary station and a clock value at a Signature Generator of the network, a clock value at the primary station, a clock value at the Signature Generator.

This allows for the communication of the time to be efficient in terms of overhead as it can be coded as an deviation (or offset) from the time already available of the primary station.

In another variant of the first aspect, the step of deducing a local time reference includes computing an average from a plurality of the time reference information originating from primary stations with a valid signature and without duplicate cell identifier with earlier time.

Thus, this allows to mitigate some errors or deviation of the time. This also renders more difficult an attack as the computed time would only be based partially on the False Base Stations, requiring thus a larger number to be really detrimental.

In still another variant of the first aspect of the invention, the step of deducing a local time reference includes selecting the time reference information with the latest value originating from primary stations with a valid signature.

This variant thus uses the latest time displayed by the various validated primary stations. Thus, this helps to prevent a False Base Station using an old time value in order to replay past messages and pass the freshness criteria once in operation.

Further, in accordance with another aspect of the invention, which can be used independently or in combination from the first aspect and its variants, it is proposed a method for a secondary station comprising the secondary station at initial connection to the network sending a request for a time reference, said request being addressed to a Signature Generator, wherein the request for time reference includes a randomly generated number used as a nonce, receiving the time reference and the nonce, wherein the time reference and the nonce are signed with a nonce signature, using the nonce and nonce signature to check authenticity of received messages, using the received time reference to configure a clock at the secondary station.

In a variant of this aspect of the invention, the request is part of an Initial Radio Resource Communication, RRC, setup request message. Alternatively, the request may be part of a Network Access Stratum, NAS, identity response message sent in response to a NAS identity request.

This aspect of the invention, which can be used in combination with the first aspect of this invention in order to render the system even more reliant against attacks, presents the advantage of an early integration. Thus, this solution does not leak any secondary station information, despite adding some steps to the Radio Resource Control, RRC, setup procedure and state machine at the primary station.

In a variant that can be used in combination with all the previous aspects of the invention and their variants, the received signature is checked using at least one of the following algorithm: a Public Key Infrastructure, PKI, algorithm, a Boneh-Lynn-Shacham, BLS, signing algorithm, a Boneh-Gentry-Lynn-Shacham, BGLS, signing algorithm, an Elliptic Curve Digital Signature Algorithm, ECDSA, Falcon signing algorithm, Rainbow signing algorithm, a Great Multivariate Short Signature, GeMSS, algorithm.

In accordance with a second aspect of the invention, it is proposed a secondary station as claimed in claim 9. This secondary station is adapted for communicating in a network and comprises a receiver adapted to receive a plurality of system information, SI, messages from a plurality of primary stations, said SI messages including each a respective time reference information related to the corresponding primary station, a controller configured to check the validity of a received signature for each of the primary stations, and to check a cell identifier at least for each of the primary stations with a valid signature, and ignore time reference information from primary stations with a cell identifier being identical to another primary station and having an earlier value than the one from the other primary station, and said controller being adapted to deduce a local time reference from one or more of the time reference information originating from primary stations with a valid signature.

Thus, by not removing the configuration messages originated from primary station having the same identifier before the signature verification, it allows to first exclude any False Base Station that would use already existing identifiers. It is thus no more possible for the attackers to cause the secondary station to exclude real primary station by this check. As a result, this enables the secondary station to obtain the correct timing information required for the freshness checks once in operation in the network.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the method of claim 1, and the secondary station of claim 9 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION

Figure 1:
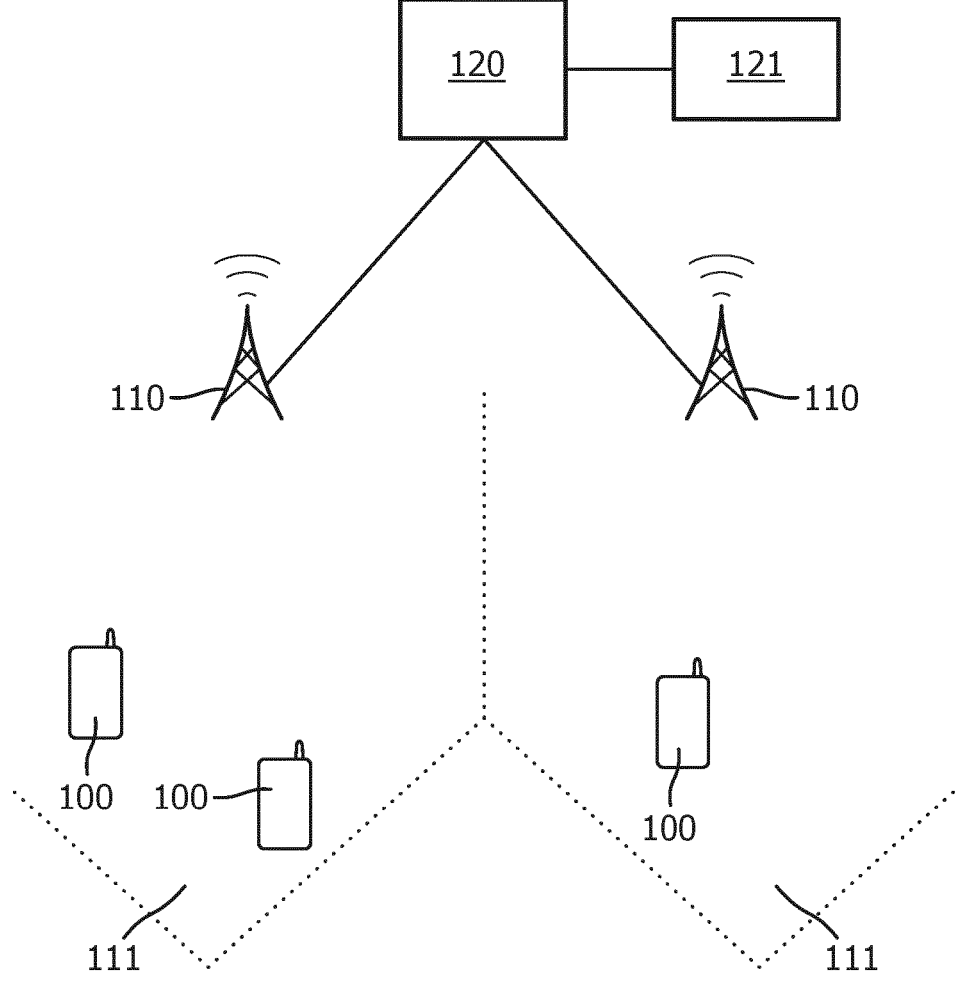
FIG. 1 already described, is a block diagram representing a cellular network in which the invention can be implemented.
Figure 2:
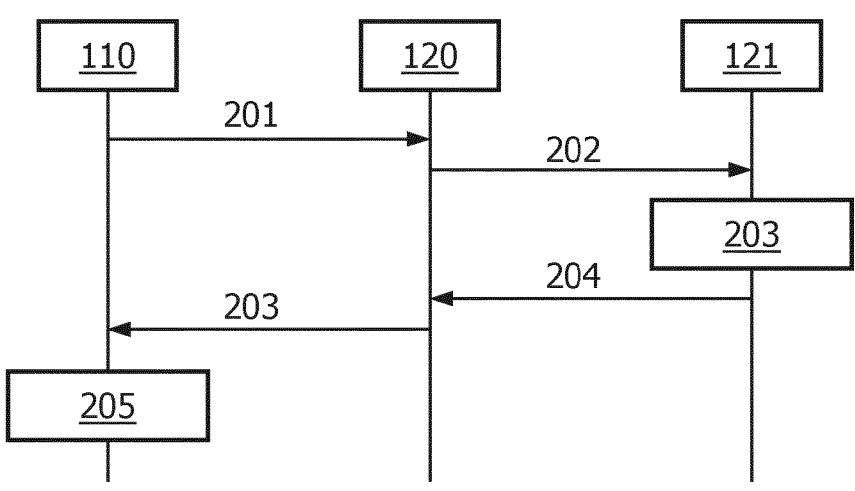
FIG. 2, already described, is a logical time diagram representing the messages exchanges in accordance with a protocol proposal.

As seen above, the present invention can be implemented in a cellular network as for example a 5G network. As seen in relation with FIG. 1, such a cellular network comprises a plurality of terminals or secondary stations 100, being mobile devices (or UEs) that may travel from a network cell to another 111. Each cell 111 is served by a primary station 110 (or a gNodeB) which makes the interface between the secondary stations 100 and the Core Network 120.

Therefore, the secondary stations 100 communicate with the primary stations 110 on various radio channels, uplink (from the secondary stations to the primary station) and downlink (from the primary station to the secondary stations). Other radio channels exist, for example between secondary stations (for example Sidelink channels) and between primary stations (e.g. X2 interface), but are not represented for the sake of simplicity of FIG. 1. The embodiments of the invention could also be applied to these interfaces however it will be focused in the following parts of the description to the links between the secondary stations and the primary stations.

In order to allow secondary stations to connect to the network, the primary stations 110 may broadcast some configuration information over the cells 111. This configuration information includes Master Information Blocks (MIBs) and System Information Blocks. First, the MIB is a message broadcasted periodically (e.g. every 80 ms) and which includes all the required information to allow the decoding of the following SIBs.

```
MIB ::= SEQUENCE {
    systemFrameNumber          BIT STRING (SIZE (6)),
    subCarrierSpacingCommon    ENUMERATED {scs15or60,
                                 scs30or120},
    ssb-SubcarrierOffset       INTEGER (0..15),
    dmrs-TypeA-Position        ENUMERATED {pos2, pos3},
    pdcch-ConfigSIB1           INTEGER (0..255),
```

7

-continued

| cellBarred | ENUMERATED {barred, notBarred}, |
| intraFreqReselection | ENUMERATED {allowed, notAllowed}, |
| spare | BIT STRING (SIZE (1)) |
| } | |

Once the secondary station obtained the MIB, it can decode several System Information Blocks that can be transmitted periodically as well (e.g. every 80 ms, 160 ms) or on request from the secondary stations. These SIBs describe the operation and parameters of the network. In order to improve the security of the whole network, it is proposed to add digital signatures to these SIBs, preventing anyone to impersonate a primary stations. A digital signature is a technique that binds an entity to the digital data. This binding can be independently verified by receiver as well as any third party. Thus, a digital signature is a cryptographic value that is calculated from the data and a secret key known only by the signer. The data corresponds in the present case to the payload carried in the SIBs themselves. The signature allows the secondary station to have assurance that the message belongs to the primary station.

In the example of 5G, one of the options available is that a Digital Signature Generator of the Core Network 120 generates and provides signatures to the primary stations 110 upon request from these primary stations for each message. Another option is that a Digital Signature Generator in included in each of the primary stations. This solution could be used for at least some of the messages, which would reduce the load on the Digital Signature Generators of the Core Network.

One of the aspects of these signatures is to ensure that the signature was not added by a third party, e.g. an attacker that is replaying messages to impersonate a real primary station. To avoid this, a freshness value can be added to the signature to ensure that the signature was generated recently. Therefore, one option to verify the freshness of the information is by synchronizing clocks and checking that the information is not too old. Time is based on the time owned by the Signature Generator (DSnF) and the secondary stations (UEs) must know this time. This time might differ from the other time available to the secondary station or the time available at the primary station. However, this requires the secondary stations and entity generating the signature to be synchronized in some way.

From the whole network point of view, the operation of the Signature Generator (DSnF), the primary station (gNB) and the secondary station to deal with time differences can be as follows:

when the primary station sends a signing request to the Signature Generator for at least some of its parameters, for example its static parameters i.e. that remain unchanged during a long_interval period of time, the primary station may include its own time. When doing so, the primary station and the Signature Generator may run a time protocol (such as Simple Network Time Protocol, SNTP) to correct timing errors due to the latency of message transmission or different local times. The Signature Generator may sign a field relative to the time difference between the primary station clock value and the Signature Generator clock value, e.g. a gNB_DSnF_time_difference field. Since this value should not deviate much over time, this is a static field as long as the difference between the clocks does not deviate more than a threshold.

Typically, time should remain in sync during a long interval period of time. If this assumption does not hold, the primary station then asks again the Signature Generator to sign the time difference. The Signature Generator may then include in each signed message the latest static time difference with the primary station as well as its current time.

In operation, the primary station may broadcast on a regular basis the signed messages including the time difference between primary station and the Signature Generator. The time of the primary station is broadcasted in System Information Block 9, SIB9 or could be broadcasted in other System Information messages. To reduce the communication overhead, this time may also be included in SIB1. The time in SIB9 can includes UTC time and also GPS time and it can be computed as GPS Time (in seconds)=timeInfoUTC (in seconds)−2,524,953,600 (seconds)+leapSeconds as defined in SIB9. Alternatively, it is also possible to include the signed time owned by the Signature Generator (DSnF).

Upon reception of timing information in SIB1 and SIB9, the secondary station obtains the Signature Generator time and checks whether the received message is too old, e.g., not older than a signature validity duration, e.g., shorter than the System Frame Numbering/HyperFrame Numbering (SFN/HFN) duration (2h54'45"). In other words, the signed message is only valid for around 3 hours.

In absence of other time source, this time may be used to synchronize the secondary station clock once it joins a primary station and establishes a secure connection with the core network. The time distributed by the primary station provides a synchronization error of around 10 ms which is enough for the purposes of secure broadcast of System Information. Indeed, MIB and SIB1 are distributed with a periodicity of at least 80 ms. Once a device has joined a trusted primary station and has access to trusted Signature Generator time:

a) The device should further improve its time synchronization by using standard techniques.

b) Afterwards, the device should not update its time unless it detects that it has lost synchronization due to other reasons.

Furthermore, since above time accuracy might not be enough or the attacker could replay old signed messages from a valid primary station, the secondary station needs some external source of data to further validate its time. The following options are feasible:

if the Signature Generator has a time related to GPS, and this relation is known, the secondary station can get the time. However, not all devices have a GPS unit, or the reception of the GPS signal may not be possible in some locations.

In absence of any time reference and before joining any primary station, the secondary station can learn the broadcasted SI from multiple primary stations, and check their similarity, and take the newest time. This has the problem that an attacker might place multiple fake base stations so that a secondary station gets the wrong time. Another problem arises if the secondary station rejects primary stations with duplicate cell identifiers (PC's) prior to any signature verification. Besides the fact that this can increase the duration of the cell selection process since the process cannot end till all frequencies are scanned, this involves an additional issue. If this is done, an attacker can just advertise duplicate False Base Stations of the real base stations, i.e., with the same PCI—no signature is required, so that the secondary station will not take into account the good time measurements from those primary stations into account. In this case, the secondary station should check the signature first and reject the system information that is not properly signed. If after this step there is system information broadcasted from two different primary stations with the same PCI, then the secondary station should take the values with the most recent system information. If there are multiple primary stations broadcasting system information that is correctly signed and whose times are close, e.g., within 80 ms, an approach is to take the highest time as the correct one. However, this might also be because that the primary station is slightly out of sync. Another approach is that the secondary station computes its time as the average of the received times.

Figure 3:
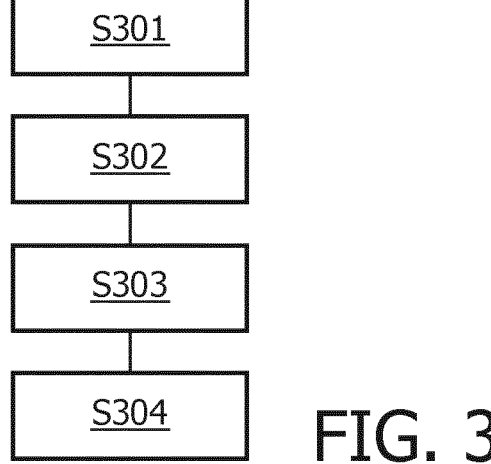
FIG. 3 is a flowchart representing a method in accordance with a first embodiment of the invention.

Thus, in accordance with a first embodiment of the invention, it is proposed for the secondary station to obtain a time reference for maintain synchronization based on signals obtained only from validly signed primary stations, as shown on FIG. 3. To do so, a secondary station 100 first receives a plurality of system information, SI, messages from a plurality of primary stations 110, for example serving all the neighbouring cells at step S301. These SI messages include each a respective time reference information related to the corresponding primary station. This time reference would typically be the clock value at the Signature Generator at time of signature of the messages or the clock value of the primary station at the time of transmission of the SI messages. The time reference may also be based on the System Frame Number and/or the subframe number in which the SI messages were sent combined with a timing mapping reference which enables the secondary station to compute the absolute time.

At step S302, the secondary station checks the validity of a received signature for each of the primary stations. Any primary station for which the signature is not found valid is then ignored for the computation of the timing information. At step S303, the secondary station then checks a cell identifier for each of the primary stations with a valid signature, and ignores time reference information from primary stations with a cell identifier being identical to another primary station. For example, the primary station having an earlier value than the primary station sharing the same cell identifier is excluded. This means that at step S303, the secondary station compares the cell identifiers of all the primary stations. If there are any duplicated cell identifiers, the secondary station assumes that primary station showing an earlier time value and a duplicated cell identifier are False Base Stations replaying past messages.

At step S304, the secondary station deduces a local time reference from one or more of the time reference information originating from primary stations with a valid signature. Thus, the secondary station after excluding False Base Stations at steps S302 and S303, can trust the remaining primary stations, and obtain a time reference with which the secondary station synchronizes its clock based on the deduced time for the purpose at least of checking freshness of the received messages.

As mentioned earlier, the time reference information may be a clock value at the primary station, or a clock value at the Signature Generator. Alternatively, the time reference may be a time offset representative of the difference between a clock value at the primary station and a clock value at a Signature Generator of the network. Thus, the secondary station can thereafter deduce the clock value of the Signature Generator from the clock value of the primary station or from the System Frame number of the message.

The computation of the local time reference at step S304 may be performed by computing averaging some or all of the time reference information originating from primary stations with a valid signature and without duplicate cell identifier with earlier time. It may be advantageous to prefer first some of the detected primary stations for example on some priority or trust credit (e.g. based on hardware or firmware version). Alternatively, the step S304 includes selecting the time reference information with the latest value originating from primary stations with a valid signature and without duplicates with an earlier time.

Figure 5:
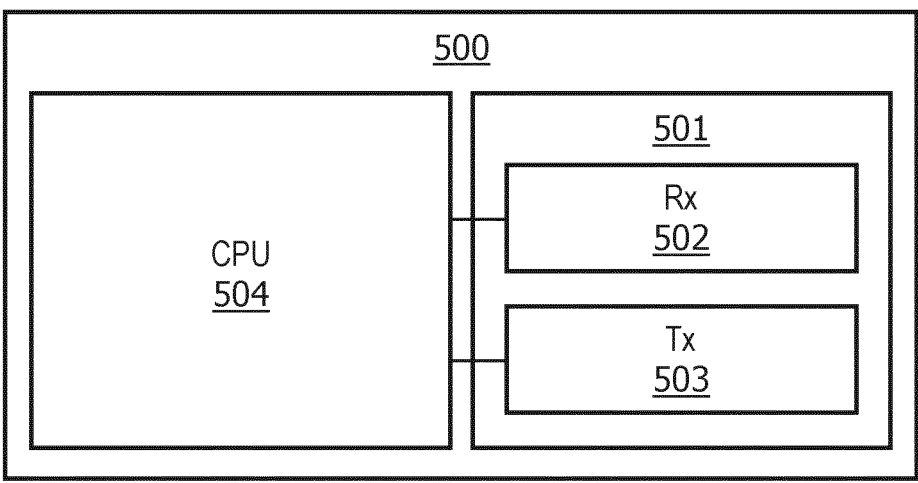
FIG. 5 is a block diagram representing a secondary station in accordance with the first embodiment of the invention.

FIG. 5 is a block diagram representing a secondary station 500 in accordance with the first embodiment of the invention. This secondary station comprises a communication unit 501 including a receiver 502 and a transmitter 503 adapted for communicating in a network, for example in a 5G cellular network.

The receiver 502 comprises at least one antenna or an antenna array with a plurality of antennas. This receiver may be adapted to receive messages sent from a plurality of primary stations. Such messages can be system information, SI, messages for configuration of the secondary station communication unit 501 in the communication network. These SI messages includes each a respective time reference information related to their respective primary station. The secondary station 500 also include a controller 504 to control the operation of the secondary station. This controller may be a Computer Programming Unit or other combination of hardware and software. The controller 504 is configured to check the validity of a received signature for each of the primary stations, and to check a cell identifier at least for each of the primary stations with a valid signature, Then, the controller 504 ignores time reference information from primary stations with a cell identifier being identical to another primary station and having an earlier value than the one from the other primary station. Eventually, the controller 504 deduces a local time reference from one or more of the time reference information originating from primary stations with a valid signature.

In a second embodiment, which can be implemented independently from the first embodiment, but which can also be combined with the first embodiment, it is proposed for the secondary station to get direct access to the Signature Generator time. The first time the secondary station connects to the network, e.g. a 5G system, and/or in absence of trusted time and/or after being offline for a long period of time, the secondary station can join a primary station even if time verification check is wrong. In this case, the first action to carry out by the secondary station is to get direct access to the Signature Generator time. No other actions must be carried out before this happens. To this end, the secondary station can start a secure time-request connection with the core network. In the first message of the time-request connection the secondary station will include a nonce (e.g., a 128-bit or longer randomly generated value) to ensure the freshness of the handshake. The secondary station will start a local timer as well. This message does not need to be secure from the point of view of the secondary station. This message will be forwarded to the Signature Generator (DSnF) that will sign its current time and the received nonce. The message is then sent to the secondary station through the primary station. Upon reception of the message, the secondary station checks the validity of the signature and the presence of the nonce so that the secondary station knows that this message is not replayed and it is fresh. It is possible for the secondary station to check whether to accept the message, if the timer does not exceed a given value, e.g., 20 ms. The secondary station may then correct the received Signature Generator time by adding timer/2. Given this time, the secondary station can proceed to check the validity of the signed system information and the time. If the received system information is recent, it can join the primary station. If it is not recent, the secondary station will disconnect from the primary station. An alternative to the above handshake is to perform any other secure time synchronization protocol with the Signature Generator to gain its time. We note that a risk of this protocol is to be misused by an attacker to send many time requests towards the Signature Generator to flood it but those time requests can be blocked at different parts of the system, e.g., primary station, if a given threshold (amount of requests per second) exceeds a threshold.

This protocol could be integrated in the initial RRC setup procedure. An approach is to include the nonce in the RRCSetupRequest. The signed answer from the Signature Generator is included by the primary station in the RRC-Setup message. The advantage of such an early integration is that this does not leak any information relative to the secondary station. However, it makes the RRC setup procedure and state machine at the primary station more complex. Alternatively, the nonce can be included in the NAS identity response message sent by the secondary station as answer to the NAS identity request.

When the Core Access and Mobility Management Function (AMF) receives this message with a nonce, the AMF forwards this to the Signature Generator for time signing. The answer should be provided before or at the same time that the AMF sends the NAS Authentication Request to the secondary station. In this way the secondary station can verify the time and the primary station certificates before engaging in any further communication.

Figure 4:
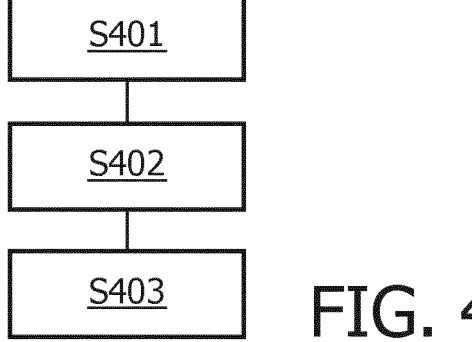
FIG. 4 is a flowchart representing a method in accordance with a second embodiment of the invention.

Thus, as seen previously, in the second embodiment now described in reference to FIG. 4, and which can be combined with the first embodiment or implemented independently, the secondary station may also at initial connection to the network send a request for a time reference at step S401, said request being addressed to a Signature Generator. This request may optionally be forwarded by the primary station to the Signature Generator, if this Signature Generator is in a separate entity than the primary station. The request for time reference includes a randomly generated number used as a nonce prepared by the secondary station.

At step S402, the secondary station receives a response message including the time reference and the nonce. The time reference and the nonce are signed with a nonce signature prepared by the Signature Generator. The secondary station then checks at step S403 the authenticity of the received message by using the nonce and nonce. Eventually, the secondary station uses the received time reference to configure a clock at the secondary station.

In this embodiment, the request may be part of an Initial Radio Resource Communication, RRC, setup request message or of a Network Access Stratum, NAS, identity response message sent in response to a NAS identity request.

In any of the previous embodiments, it is to be noted that the received signature is prepared by the Signature Generator using at least one of the following algorithm: a Public Key Infrastructure, PKI, algorithm, a Boneh-Lynn-Shacham, BLS, signing algorithm, a Boneh-Gentry-Lynn-Shacham, BGLS, signing algorithm, an Elliptic Curve Digital Signature Algorithm, ECDSA, Falcon signing algorithm, Rainbow signing algorithm, a Great Multivariate Short Signature, GeMSS, algorithm. Similarly, the secondary station uses a corresponding algorithm to verify the validity of the signature.

Additionally, in complement to the above solutions, if the Signature Generator relies on a time from a trusted external source (e.g., the current NIST beacon or the time from a known reference source), the secondary station can get the current time directly if it has a different type of connectivity, e.g., WiFi. The Signature Generator itself could also have a known API that can be known/preconfigured to the secondary station so that a secondary station can access the time source at any time as soon as it has access to the Internet.

In accordance with a third embodiment which can be used in combination of any of the first and/or second embodiments or independently, it is proposed to use different signatures depending on the type of parameters included in the System Information Blocks. Indeed, it has been recognized that some parameters included in the configuration messages are static and are unlikely to need frequent updates. Thus, it is possible to sign the static parameters once and reuse the obtained signature in following messages.

Indeed, the current solution does not exploit the fact that some fields of the System Information Blocks SIBs remain static and others keep changing. The currently used option is to always sign everything. However, this can be inefficient.

Thus, according to a first example of the third embodiment, it is proposed to compute the signature as:

DSA(HASH(HASH(fixed_field)|changing_field))

Where DSA is a Digital Signature Algorithm, e.g. ECDSA, and HASH is a hash function, e.g. a hash, a hash chain, or a Merkle Tree. The fixed_field is a field that can include one or more parameter values whose values are static by nature. By static, it is meant for example that a change of this static parameter configuration is unlikely to occur, for example as these are linked to the ground configuration of the cell. Conversely, the changing_field includes typically more dynamic parameters values that are likely to be adjusted regularly, for example based on the current load of the cell or an interference status.

This approach also reduces communication overhead since the fixed fields do not need to be submitted to Signature Generator in every single message. Instead, it can be communicated which fields remain constant and for how long, and the value of the changing fields. Similarly, when communicating with the Signature Generator, the primary station could only send HASH(fixed_field). Obviously, this has the risk that the Signature Generator does not have a chance of verifying the system information. This verification can be done once the Signature Generator; and at later iterations, the Signature Generator can only check that the hash of the fixed field does not change.

Similarly, the signature can be computed per MIB and SIB. However, it can also be computed over multiple blocks of SI including MIB, SIB1, SIB2 for example. The secondary station can for instance obtain a single signature for both MIB and SIB1 that form MSI. The signature itself can be in SIB1 and both MIB and SIB1 would need to be obtained to verify the signature. This could be advantageous in fact since MIB is very small and a long signature is unlikely to fit in it. However, it is important to verify the information transmitted in the MIB. Similarly, other information such as the PCI can be verified. In an example of this embodiment, the detected PCI, MIB, and SIB1 can be concatenated to sign them together. The resulting signature could be included in SIB1.

Similarly, the signature could be located in a new SIB that can be obtained on request by the secondary station. This can help to address backwards compatibility and reduces the communication overhead since it is only exchanged on demand. In this case, a secondary station can send a request including a nonce that will be forwarded by the primary station to the Signature Generator for signature. This approach ensures the freshness of the signed information.

Similarly, the signature can be computed on the root of a Merkle tree whose leaves are the different SIBs. In this way, it possible to verify the different SIBs individually while minimizing overhead. SIB1 includes the root of the Merkel tree that is signed. When device requests a different SIB, it is verified with that Merkle tree root.

Figure 6:
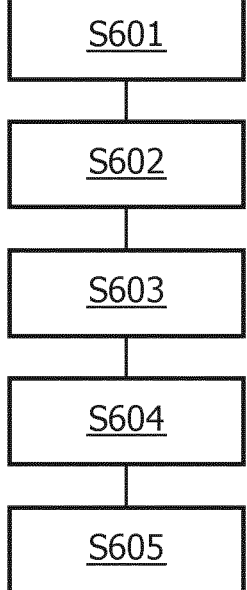
FIG. 6 is a flowchart representing a method in accordance with a third embodiment of the invention.

Thus, according to the third embodiment illustrated on FIG. 6, it is proposed a method for checking authenticity of a set of information, the method comprising receiving at step S601 at least one configuration message from a primary station at a secondary station, wherein said configuration message includes a plurality of fields relative to respective parameters, receiving at step S602 a received signature for authenticating the configuration message from the primary station at the secondary station. The steps S601 and S602 may be performed in a single step, for example if the signature is attached the message received at step S601. However, it is also possible to have a single signature used to sign a plurality of messages. In such a case, the signature may be sent after or with the last of these messages. Indeed, the step of receiving at least one configuration message may comprise receiving a plurality of configuration messages, and the received signature may authenticate the plurality of configuration messages.

The method of the third embodiment further includes obtaining at step S603 a first hash value based on a first subset of the fields, the first subset of the fields consisting of one or more first field being relative to a parameter having a static value, applying at step S604 a second hash operation on a combination of the first hash value and a second subset of the fields to obtain a second hash value, the second subset of fields consisting of one or more second field being relative to a parameter having a variable value, verifying at step S605 the received signature on the basis of the second hash value to authenticate the received configuration message.

In an example of the third embodiment, the step S605 may be performed by comparing the received signature with a signature derived from the second hash value to authenticate the received configuration message.

Thus, this embodiment allows to reduce the amount of messages a Signature Generator has to sign. Further, a stronger signature algorithm can be used to sign the static parameters of the configuration messages, thus reducing the load of computation on the secondary station as well while maintaining at least the same level of protection.

It can be noted that at step S603 of obtaining the first hash value, this can also include retrieving a previously computed first hash value, stored in a memory of the secondary station. Indeed, the first hash value may have been computed for an initial message, and reused for each of the following configuration message. This avoids recomputing this first hash value multiple times.

Indeed, for the initial message carrying (new) static parameters, the step S603 of obtaining the first hash value includes applying a first hash operation onto the first subset of fields to obtain the first hash value, and storing the first hash value for subsequent use.

In a variant of this third embodiment, it is possible to determine at step S603 whether a valid stored first hash value is present in a memory of the secondary station, and to retrieve such first hash value from the memory upon determination that a valid first hash value is present. Else, the secondary station may apply a first hash operation onto the first subset of fields to obtain the first hash value, and store the first hash value for subsequent use in the memory upon determination that a valid first hash value is not present. In such a variant, the first hash value is considered valid if one or more of the following conditions is satisfied: the time elapsed since its generation is below a validity threshold, the identity of the primary station is authenticated, the primary station is the currently serving primary station.

Such a validity threshold value can be signaled from the primary station or be equal to the periodicity of some System Information messages.

At step S604, the method of the third embodiment may include deriving the derived signature by applying a digital signature algorithm onto the second hash value.

Like in the previous embodiment, wherein the digital signature algorithm is an ECDSA (Elliptic Curve Digital Signature Algorithm).

Figure 7:
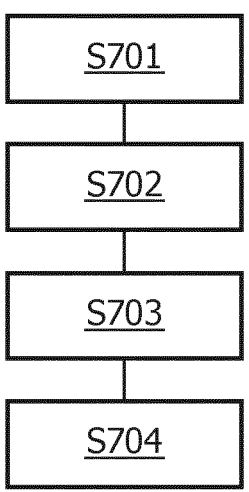
FIG. 7 is a flowchart representing a method in accordance with another aspect of the third embodiment of the invention.

In a further aspect of the third embodiment shown on FIG. 7, it is proposed a method for generating a signature for authenticating a set of information, the method comprising At step S701, receiving at a signature generator from a primary station at least one configuration message for configuring a secondary station, wherein said configuration message includes a plurality of fields relative to respective parameters. The signature generator then obtains at step S702 a first hash value based on a first subset of the fields, the first subset of the fields consisting of one or more first field being relative to a parameter having a static value. The signature generator can then apply at S703 a second hash operation on a combination of the first hash value and a second subset of the fields to obtain a second hash value, the second subset of fields consisting of one or more second field being relative to a parameter having a variable value, generating a signature derived from the second hash value to authenticate the configuration message. In an alternative, this step may be performed at the primary station after reception of the first has value.

At step S704, the signature generator transmits to the primary station the signature.

In such a case, the step of obtaining the first hash value may comprise one of the following steps:

receiving the first hash value from the primary station, retrieving a previously computed first hash value, stored in a memory of the secondary station, or applying a first hash operation onto the first subset of fields to obtain the first hash value.

Figure 8:
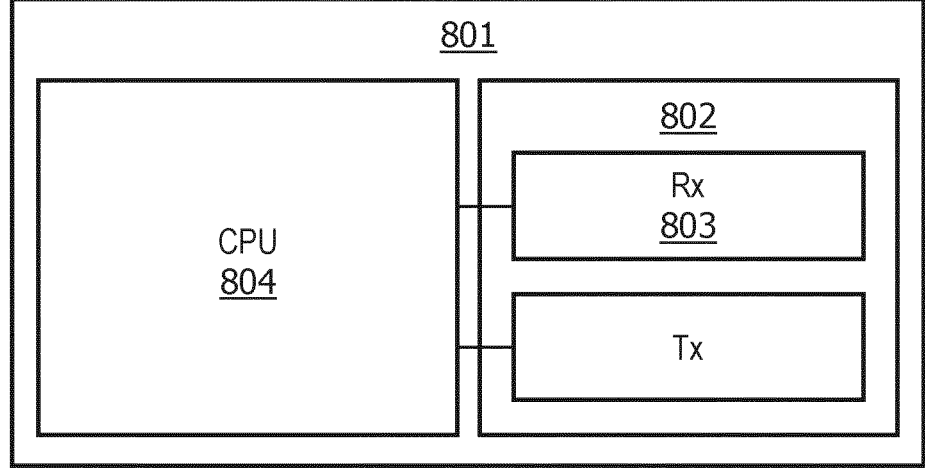
FIG. 8 is a block diagram representing a secondary station and a Signature Generator in accordance with the third embodiment of the invention.
Figure 8:
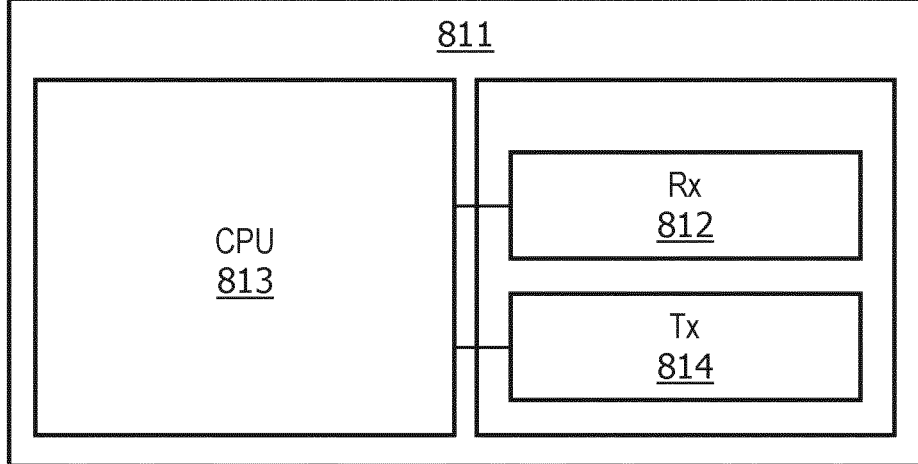

The structure of such a secondary station and Digital Signature entity is shown in FIG. 8. On FIG. 8, a secondary station 801 comprises a communication unit 802 including a receiver 803. This receiver 803 is adapted to receive at least one configuration message from a primary station, wherein said configuration message includes a plurality of fields relative to respective parameters. The receiver is also configured to receive a received signature for authenticating the configuration message from the primary station.

The secondary station also includes a controller 804 which is configured to obtain a first hash value based on a first subset of the fields, the first subset of the fields consisting of one or more first field being relative to a parameter having a static value. This controller may be a Computer Programming Unit or other combination of hardware and software. The controller can perform a second hash operation on a combination of the first hash value and a second subset of the fields to obtain a second hash value, the second subset of fields consisting of one or more second field being relative to a parameter having a variable value and then to verify the received signature on the basis of the second hash value to authenticate the received configuration message.

The Signature Generator 811 of FIG. 8 is adapted to generate a signature for authenticating a set of information. In particular, the signature generator 811 comprises a receiver 812 adapted to receive from a primary station at least one configuration message for configuring a secondary station, wherein said configuration message includes a plurality of fields relative to respective parameters. This receiver 812 typically comprises an antenna or an antenna array it is connected wirelessly to the primary station. However, as the Signature Generator can be part of the Core Network, this communication unit may be wired, so for example based on an Ethernet connection or an optical fiber connection linking it to a primary station. Additionally, it is possible in a variant of this embodiment that the Signature Generator is present in the primary station itself. In such a case, the receiver is a logical receiver that receives packets from higher layers and are processed by the Signature Generator 811.

The signature generator comprises a controller 813 to obtain a first hash value based on a first subset of the fields, the first subset of the fields consisting of one or more first field being relative to a parameter having a static value. The signature generator controller 813 can apply a second hash operation on a combination of the first hash value and a second subset of the fields to obtain a second hash value, the second subset of fields consisting of one or more second field being relative to a parameter having a variable value. The controller is configured to generate a signature derived from the second hash value to authenticate the configuration message.

Eventually, the signature generator comprises a transmitter 814 to transmit to the primary station the signature. As seen before, it is possible in a variant of this embodiment that the Signature Generator is present in the primary station itself. In such a case, the transmitter is a logical transmitter that transmits packets to lower layers of the primary station.

In accordance with a fourth embodiment of the invention that can be implemented independently or in combination of the previously discussed embodiments, it is proposed a method for checking authenticity of a set of information in which different signature verifications algorithms are selected depending on the time.

Indeed, when considering efficient signature algorithms that are for example quantum-resistant, it is important to realize that the currently known quantum-resistant (QR) signature algorithms are bulky, in either their public-keys, or their signatures, or both. As a comparison, it must be considered that Master Information Block (MIB) has a total size of 23 bits as seen earlier and SIB1 (SI message) is limited at Physical layer to a maximum of 2976 bits. This maximum physical size limits the applicability of most of the available QR algorithms. In fact, GeMSS and Rainbow are the only feasible quantum-resistant options—having signature sizes between 34 and 64 bytes long—assuming that their very bulky public-keys can be pre-configured on the end devices. It might also happen that with further scrutiny these solutions become less efficient or are even broken.

This fourth embodiment details a solution that is more efficient and can be quantum resistant. A proposed signing solution may be based on a combination of a strong (QR)

Digital Signature Algorithm (DSA) and a lightweight DSA. The strong (QR)DSA can be ECDSA using long keys, e.g., equivalent to AES128 or higher. The lightweight DSA can be ECDSA using small keys, just strong enough to sign the information during a short period of time. Alternatively, the lightweight DSA can be based on a lightweight signature algorithm based on hash chains. This example is the method used in the remaining of the description, but it can be replaced by ECDSA with short keys or other combinations of DSAs.

Figure 9:
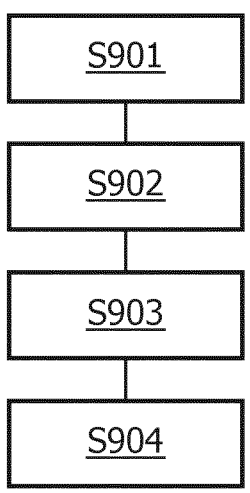
FIG. 9 is a flowchart representing a method in accordance with another aspect of a fourth embodiment of the invention.

In accordance with the fourth embodiment, it is proposed a method for checking the authenticity of message as described on FIG. 9. Such a method comprises a step S901 of receiving a sequence of configuration messages from a primary station at a secondary station. At step S902, the secondary station may receive for each configuration message at least one corresponding signature. Alternatively, a single signature may be used for a set of configuration messages (e.g. MIB+SIB1). At step S903, the secondary station selects at least one digital signature algorithm out of a set of digital signature algorithms, depending on a time reference. This means that, depending on the time instant one or the other DSA algorithm is selected and used to verify the received messages.

Then, at step S904, the secondary station verifies the received signature based on the selected digital signature algorithm. Optionally, a public key may also be used to verify the received signatures.

In a first variant of the fourth embodiment, a first digital signature algorithm is selected more frequently than a second digital signature algorithm. For example, a shorter signature may be used more frequently as it leads to less overhead. Then, with a longer periodicity, a longer signature may be used. As another example, the first signature algorithm is less complicated than the second digital algorithm. This means that the first algorithm requires less computation power to generate and/or to verify the signature than the second algorithm. In an example, the periodicity with which the second algorithm is used equals k times a configuration period. This configuration period is, e.g., a periodicity of variable parameters. The second period may for example be the SFN duration. The second algorithm may be an ECDSA. The first Signature algorithms may be based on hash, for example a hash chain, used in the shorter intervals, only when the second Signature algorithm is not used. Alternatively, the first signature algorithm is always included, which means that in case when the second algorithm is used, the configuration messages include two signatures.

Further, it should be noted that a preferred variant of the fourth embodiment is that in which the messages in the second period can include the signature of the fields that remain static during the second period, one of those fields is the public-key used to verify the configuration messages that are sent with a configuration period, in a similar manner as in the third embodiment.

Thus, as seen previously, the configuration message can be sent periodically with a configuration period, and a second digital signature algorithm is selected periodically once every second period, wherein the second period is a multiple of the configuration period, said multiple being at least 2. A first digital signature algorithm is selected otherwise or for every message.

The first algorithm may be based on at least one of a hash chain algorithm, a Boneh-Lynn-Shacham, BLS, signing algorithm, a Boneh-Gentry-Lynn-Shacham, BGLS, signing algorithm and wherein the second algorithm may be at least one of an Elliptic Curve Digital Signature Algorithm, ECDSA, Falcon signing algorithm, Rainbow signing algorithm, a Great Multivariate Short Signature, GeMSS, algorithm. In a specific exemplary implementation, the first algorithm is an Elliptic Curve Digital Signature Algorithm, ECDSA, and the second algorithm is also an ECDSA, however, the first algorithm uses shorter keys than the second algorithm.

As discussed earlier, the third embodiment may be combined with this embodiment, in the following manner. The configuration message may thus include a plurality of fields relative to respective parameters. In this example, a first digital algorithm of the digital signature algorithms includes the steps of obtaining a first hash value based on a first subset of the fields, the first subset of the fields consisting of one or more first field being relative to a parameter having a static value.

Then, a second hash operation is applied on a combination of the first hash value and a second subset of the fields to obtain a second hash value, the second subset of fields consisting of one or more second field being relative to a parameter having a variable value. Further, a second digital algorithm of the digital signature algorithms may include the steps of applying a first hash operation to obtain value based on a first subset of the fields, the first subset of the fields consisting of one or more first field being relative to a parameter having a static value.

Regarding the various Digital Signature Algorithm, a natural choice is to select ECDSA as specified in FIPS 186-4 specifications as a signature algorithm. Some other solutions allowing for shorter signatures, batch verification, and pre-computation of the signing process are based on bilinear maps. However, it is highly possible that ECDSA and solutions relying on bilinear maps will be used for a limited amount of time due to the advent of quantum computers. Furthermore, even if ECDSA is used and despite its relatively good performance, public-key crypto is still more expensive that simple symmetric-key operations. In some literature, it is reported that the computation of a hash chain with 10000 links takes 14 msec and the verification of an ECDSA 224 signature takes 6.81 msec.

Thus, the proposed signing solution in the fourth embodiment may be based on TESLA (which is hash chain based) and a (QR) DSA. TESLA describes a secure broadcast approach enabling source authentication which is given by a hash chain HC:

$h_{n} < -h_{n-1} < -h_{n-2} < -< -h_{0}$, at time i, where $h_{n-i}$ can be used to compute a message authentication code (MAC) of message m as MAC(m, $h_{n-i}$).

Here $h_{i+1}=hash(h_{i})$. The value $h_{n-i}$ is disclosed at time i+1 allowing the receiving parties to verify the previously received MAC by checking
(1) the previously received MAC and
(2) whether the received $h_{n-i}$ equals hash($h_{n-i-1}$).

$h_{0}$ is the seed of the HC from which all values are derived. $h_{n}$ is the trust anchor that needs to be distributed in a secure and trusted way to all devices.

This fourth embodiment integrates the hash chain approach in the 5G DSnF system as follows:

The Signature Generator may have both seeds of hash chains and a pair of public/private keys of a suitable DSA, e.g., ECDSA or a QR DSA. The primary station station gNB and the Signature Generator DSnF run a protocol to synchronize their clocks so that the DSnF is aware of the current time of the primary station and can correct any communication delays. A primary station gNB can ask the Signature Generator for the MAC of a message for time i on demand. The Signature Generator may use the hash chain links to efficiently compute the corresponding MACs that delivers to the base station. It is to be noted that these communication flows can be done in advance. The Signature Generator makes use of the time synchronization protocol to be aware of any potential time difference between clocks that is included in the signed messages.

The primary station can broadcast to the secondary stations the signed system information, which has been provided by the Signature Generator, at the right instants of time afterwards.

The Signature Generator may distribute to all subscribed primary stations the used hash chain elements $h_{n-i}$ at time i, that are then further broadcasted by the primary stations to the secondary stations. The first flow of data can be done on demand, i.e., when source authenticated information needs to be signed so that it can be broadcasted at a later point of time. The second communication flow in which the hash chain elements are disclosed requires tight synchronization.

Figure 10:
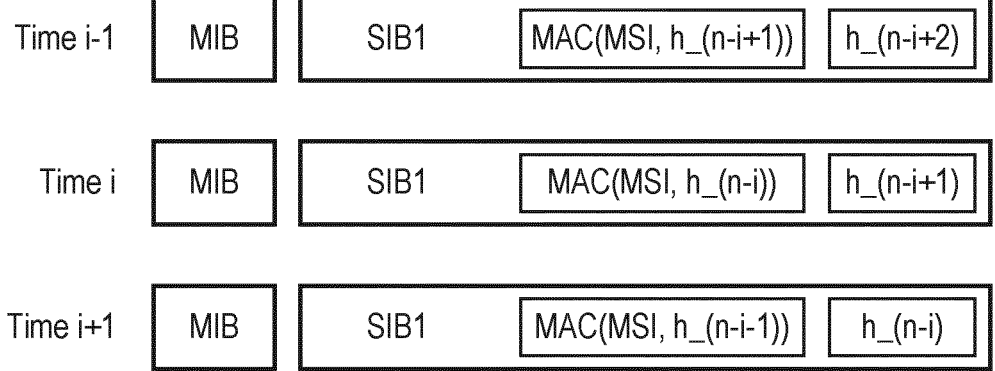
FIG. 10 is a time diagram showing a protocol of transmission of successive messages and corresponding signatures in accordance with the fourth embodiment of the invention.

In the context of 5G, it is known that MIB and SIB1 are broadcasted in intervals of 80/160 ms. Thus, the Signature Generator has to distribute with the same frequency the next hash chain element, and this element is broadcasted to all UEs as part of the SI. For instance, it can be considered that the minimum system information (MSI=MIB+SIB1) is protected in this way as depicted in FIG. 10. Note that Time i can represent in this case, e.g., a 160 ms slot. At time i+1, the Hash Chain link used to compute the previous MACs is disclosed. This means, e.g., that all messages within a 160 ms interval use the same Hash Chain link. Such a Hash Chain approach is shown for example on FIG. 10, representing the sequence of configuration messages and their corresponding signatures.

In the case where the secondary station keeps track of the System Information blocks and it has been initialized with the Hash Chain anchor, then the verification is very fast since a single hash computation is required to verify the previously received hash value. When the secondary station is new to the system, it needs to first receive and verify the HC anchor. Distributing it after the initial NAS handshake is not an option since it can mean that the UE joins a FBS. Thus, going around an actual digital signature algorithm (DSA) does not seem feasible. A very suitable option consists in having a combination of a traditional signing algorithm and hash chain.

Once every long_interval seconds (for instance, it could be every 10.24 seconds that is the duration of the system frame number), the Signature Generator signs the next hash chain anchor with a digital signature algorithm (DSA) and distributes it to the primary stations that broadcast it to all secondary stations.

Figure 11:
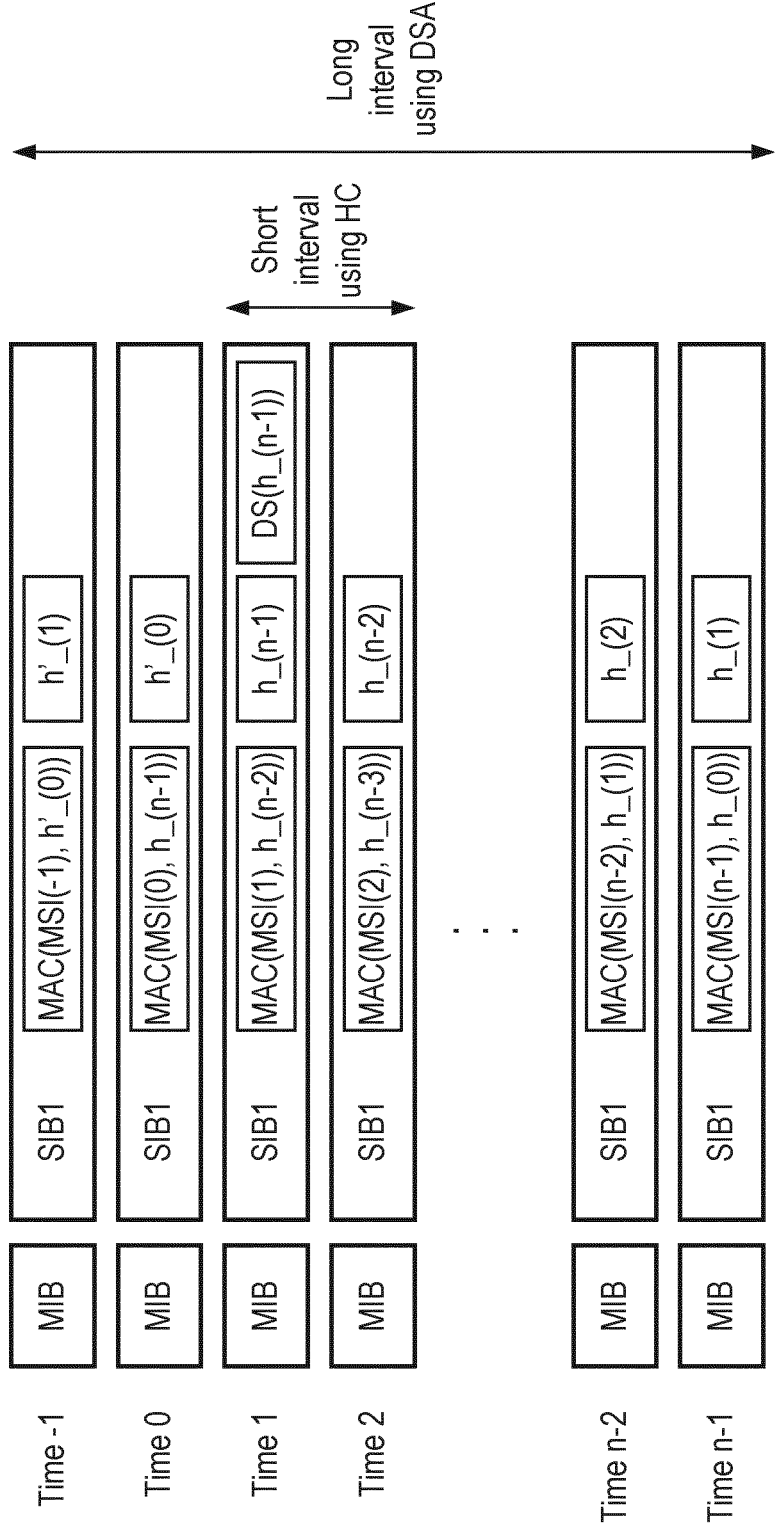
FIG. 11 is a time diagram showing an alternative protocol of the successive messages and corresponding signatures in accordance with a variant of the fourth embodiment of the invention.

The periodic MIB/SIB1 may be signed at short_interval period of time by means of a MAC following the hash chain approach. This is shown in FIG. 11 where the DSA signed anchor is distributed at time 1. This approach combines Hash Chain and Digital Signature Algorithm. With this approach, when the secondary station is joining primary station serving a cell, it requires acquiring the Hash Chain anchor and verifying the Signature. This may leads to a small delay, but afterwards the CPU performance increases a lot since verification is based on a simple hash. If the Signature Generator owns both the private key and the seed of the hash chain, then a secondary station can acquire a Hash Chain anchor that can be valid for multiple primary stations. Thus, this decreases the resource requirements when a secondary station scans multiple primary stations.

It is to be noted that a different approach is to split the signing capabilities between the Signature Generator and the primary stations in a kind of Public Key Infrastructure where the Signature Generator is in the top and the primary stations are signed by the Signature Generator. The Signature Generator is in charge of signing with the second signature algorithm the anchor of the hash chain used during a long_interval. When this signature is performed, the DSA can also check that the anchor corresponds to a known seed known to a primary station only (this requires confidentiality in the exchange between the Signature Generator and the primary station). The Signature Generator will sign a single time all parameters that remain static in the long_interval period of time. The The Signature Generator provides the primary station with the signed anchor and signed fixed parameters. The primary station keeps broadcasting these fixed parameters as indicated in FIG. 11 during the long interval. Signing of any dynamic parameters or SIBs requested on demand is done by the primary station based on the Hash Chain approach. This approach is very suitable for situations in which the secondary station can ask on demand for certain SIBs (SIB2-SIB5) and where strict time synchronization is required.

When both a Digital Signature Algorithm and Hash Chain approaches are used, the signature of static fields of multiple SIBs (e.g., PCI, MIB, SIB1, SIB2, . . . ) can be located in SIB1 or a new SIB. If it is included in a new SIB, this SIB can be sent to the secondary station on demand decreasing energy consumption. The remaining SI (e.g., SIB1, SIB2, . . . ) contain a MAC computed with the hash-chain based approach that allows for fast verification of dynamic fields.

It is to be added that, in 14 ms a hash chain with 10000 links can be generated. If the long interval is SFN and HFN, $2^20$ links are needed. This takes 1.46 seconds. If the long interval is SFN, then this will be roughly 1.4 ms. Since only a Hash Chain link is disclosed every 80 ms, the times to generate the Hash Chain becomes 18 ms and 0.175 ms. Thus, it can be concluded that a Hash Chain approach is feasible. The DSA signature can be included more frequently than the SFN interval to allow for a faster acquisition of the Hash Chain anchor and more frequent verification of static parameters. The primary station can send a request to the Signature Generator to sign the static parameters every long_interval time and during that long_interval, the primary station can keep broadcasting that signature for the fixed parameters and signs itself the dynamic parameters using the Hash Chain-based approach.

It is to be noted that if only a DSA with a bulky signature is available, or if PKI involving bulkier certificates is required to verify the public keys, the DSA signature can be fragmented over multiple messages with the purpose to sign a single anchor. For instance, if in every SIB1 we can include a fragment of 64 bytes and the signature+certificate signing a 32 byte anchor is 1600 bytes long, we can split the signature+certificate in 25 consecutive messages. It could be also a single new SIB, but having a fragmentation field to indicate the fragment number. If a new message is broadcasted every 160 ms, then the long interval is at least 4 seconds long. Still, this approach ensures that every single message can be signed and verified when the secondary station has acquired the anchor (faster verification) and that the verification is faster.

In the above example, if the secondary station does not have the anchor yet, it needs to wait 4 seconds till it can start verifying all messages. Alternatively, the system broadcasts the signature of both the new anchor and of the old anchor. This allows the secondary station to start receiving packets, e.g., starting with h_(n−i), pre-verifying them with the hash-based approach, and as soon as the old anchor h_0 is received, the secondary station can compute n−i hashes to complete the verification.

In order to avoid potential attacks in which a secondary station does not have a good time synchronization with a Signature Generator and an attacker tries to exploit this situation by recording messages and replying them while misusing the disclosed HC links, the system can be enhanced by including the hash of the messages protected with the HC approach as input of the message that is signed with the DSA algorithm. This means that an attacker cannot use misuse those values at its will.

Thus, the broadcasted anchors can be part of different hash chains, i.e., having two different seeds, or intermediate links in a same hash chain separated by n hash operations. To determine the case, the hash anchor is encoding using the following format:

0XYZ . . . XYZ (new anchor for a new hash chain)
1XYZ . . . XYZ (new anchor corresponding to an intermediate link in the previous hash chain)

Here, XYZ . . . XYZ correspond to the actual hash value, i.e., h_(n−i). This differentiation is important so that if a secondary station is already listening to the primary station for some time, the verification of a new anchor that is an intermediate link in the previous hash chain can be performed faster with a single hash operation.

In accordance with a fifth embodiment, which may combined with the previous embodiments or implemented separately, it is proposed to determine a location of primary station the secondary has contacted and to verify if this location is in agreement with a reference location for this primary station.

More specifically, in some of the proposed solutions, the Signature Generator performs the verification of primary station by doing the following:

1. Get the public-key trust anchors
2. Cell scanning: scan frequencies; exclude PCI duplicates
3. Verify digital signatures excluding any with a wrong signature
4. Verify time counter: exclude the ones with old timer.

However, this approach has some drawbacks. First, it requires setting up the trust anchors. Further, it excludes Physical Cell Identifiers (PCI) duplicates directly, and this means, that this can lead to a Denial of Service attack if an attacker advertises False Base Stations with the same PCI than those in the area or worse connectivity. The secondary station might not scan everything or might just miss some information due to interferences during scanning. It is also recognized by the inventors that the physical location is currently not checked. This location is a parameter that must be verified and checked by a secondary station to make sure that an attacker does not rebroadcast information at a different location. Similarly, even if digital signatures are used, private keys can be compromised in the same way that the private keys of certification authorities have been compromised. If this happens, an attacker could still place False Base Stations publishing System Information signed with a compromised private key.

It is thus proposed in this fifth embodiment to solve these problems. To avoid the problem of excluding base stations with a duplicated identifier, in addition or alternatively to the solution of the first embodiment, it is possible to make use of location information derived from data broadcasted at physical layer. One of the advantages of this embodiment is that this can happen even before MIBs and SIBs are processed (and digital signature verified). For instance, if two signals with the same cell identifier are coming from different locations and the secondary station is aware that the (a) primary station is located in one of them, but he is not aware of any primary station in the other location, then the secondary station can filter out the primary station whose location does not match the known location.

In particular, a secondary station can also have access to the location information of primary station. Therefore, according to the fifth embodiment, it is proposed a method for validating the identity of a primary station, the method comprising receiving at least one signal at a secondary station. The secondary station then determines a location parameter based on said received signal. Then, the determined location parameter is compared to a reference location parameter linked to the identity of the primary station to decide whether the primary station is trustworthy.

Thus, the secondary station can determine if the received signal is likely to originate from the site of a real primary station. This renders an attack more difficult since the physical location could exclude part if not all of the false primary station of such an attacker.

In a first variant of the fifth embodiment, the determination of the location parameter comprises estimating a radiation pattern of the primary station, and wherein comparing the determined location parameter to a reference location parameter includes comparing the estimated radiation pattern to a reference radiation pattern of the primary station. In such a case, the secondary station may take into account its own location to determine reference radiation pattern.

In an example of this first variant of the fifth embodiment, the estimation of the radiation pattern by the secondary station may include counting the number of detected radiation beams for a primary station. The secondary station then compares this number of radiation beams to a reference radiation pattern in the form of a reference list. Such a reference list may include for each referenced primary station the number of radiation beams the primary station is using or a maximum number of beams the primary station is capable of using. The listed reference list may include the identity (e.g. PCI) of the primary station. It can also include the location (e.g. GPS coordinates) of the referenced primary stations.

It is to be noted that this above method has the advantage that it can also be used for UEs in very bad deployment scenarios, and does not require very dense information from the base station related to the expected radiation pattern (e.g., radiation pattern for each point in space (steps of 1 mm, cm, m) around the base station) to be able to perform the similarity check. It also does not require the knowledge about the exact position of the base station and UE, as the similarity check of the radiation pattern consists in just counting the number of SSB beams that are present in the broadcasted signal of a base station. This amount of information is very limited, it is just the number of SSBs associated to a Physical Cell Identifier (PCI). The PCI is also broadcasted as part of the synchronization block. Based on this information that a UE can receive out-of-band or in a secure way the first time a UE connects to the network, the UE can do the following:

a) UE scans a cell reading the SSBs and PCI.
    b) UE checks the number of expected SSB beams for that PCI based on the radiation information deployed to the UE c) UE checks that the measured number of SSBs matches the expected number of SSBs for that PCI.

In this variant, the reference radiation pattern may be obtained from a database of primary stations. For instance, the application mastdata offers this data. Another possibility is that network operators who trust each other exchange the positions of the primary stations creating a combined list of primary stations. The primary stations located in the tracking area where the secondary station is located are stored on the secondary station. When receiving MIB and SIB1, if the secondary station determines that the position of one of the primary station having a duplicated cell identifier does not match its expected location, the secondary station can only exclude that primary station.

Alternatively, the secondary station may collect a radiation pattern and report it to a known primary station which, optionally in collaboration with the network, check the received radiation pattern. This can be done single radiation pattern by single radiation pattern or it could include the preliminary step of the secondary station collecting over a period of time a plurality of radiation patterns and report them (as a whole, or iteratively) to the known primary station. Location of the secondary station corresponding to each measured radiation pattern may be included.

Figure 12:
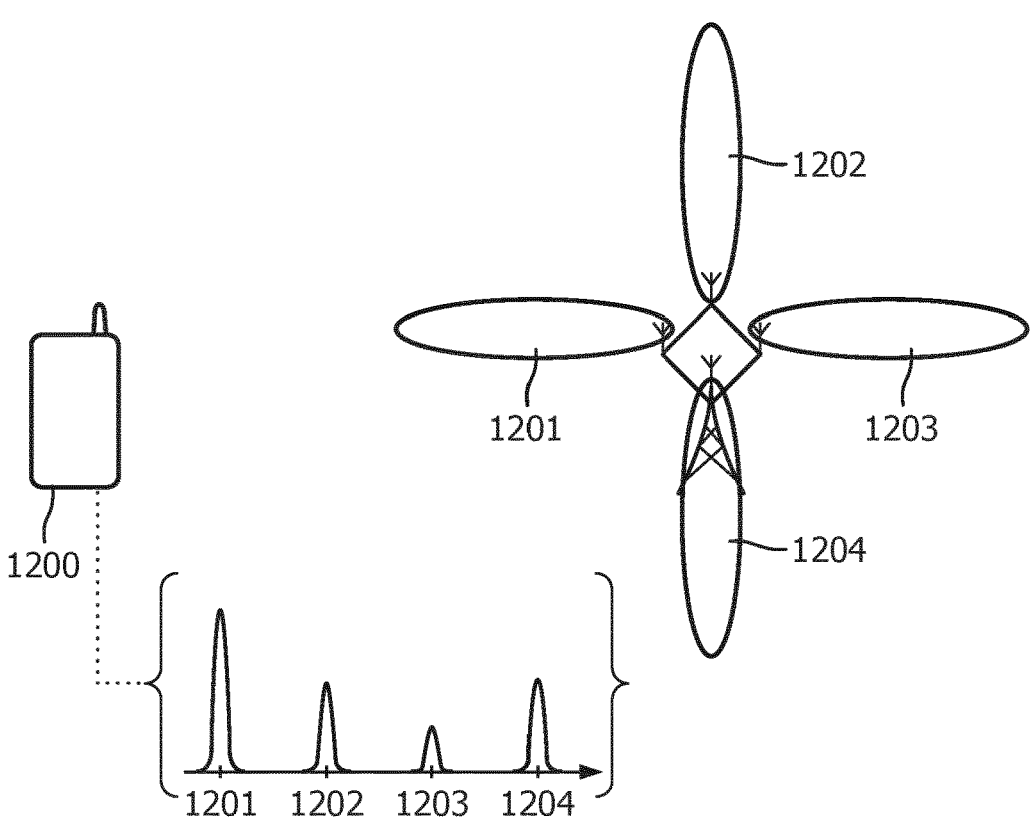
FIG. 12 is a block diagram representing a network in accordance with a first example of the fifth embodiment.

In a further example of this variant that could increase the accuracy and the robustness of the check, the location of the primary station can be estimated, in addition to (or instead of) the number of radiation beams, by taking into account that a primary station broadcast the synchronization signals using different beams radiated in different directions and using a different identifier as can be shown on FIG. 12. In particular, 5G supports up to 1008 PCIs computed as $3N_{SSS}+N_{PSS}$ where $N_{SSS}=\{0, 1, \ldots, 335\}$ and $N_{PSS}=\{0, 1, 2\}$. Here, SSS refers to the Secondary Synchronization Signal identifier and PSS refers to the Primary Synchronization Signal identifier. The PSS and SSS are transmitted as part of a Synchronization Signal Block (SS Block). SSBs is transmitted in a batch by forming an SS Burst (one SSB per beam) that is used during beam sweeping by changing beam direction for each SSB transmission. The maximum number of SSBs in an SS Burst is frequency-dependent and it can be 4 (below 3 GHz), 8 (3 to 6 GHz), or 64 (6 to 52.6 GHz). The periodicity of the SSB is configured by the network, while the default transmission periodicity for initial cell selection, the SS burst set periodicity is default at 20 ms for all frequency ranges i.e., 2 NR frames. The primary station defines multiple candidate positions for SSBs within a radio frame. Each SSB, radiated in a different direction, can be identified by a unique number called SSB index and identification of which SSB is detected is depend on where secondary station is located. The secondary station can measure the signal strength of Demodulation Reference Signal (PBCH DMRS) of each SSB it detected for a certain period (a period of one SSB Set). From the measurement result, the secondary station can identify the SSB index with the strongest signal strength. This SSB with the strongest signal strength is the best beam for the secondary station.

If the secondary station knows the normal radiation pattern (number and/or direction of the SB #) of a primary station and its own location (e.g. by GPS), and has measured a primary station, has information about the PCI, and the best SBs and relative received power can have an indication whether the primary station is real or false.

In FIG. 12, an attacker places a FBS targeting UE1. Since the UE1 makes use of the technique used in this part of the invention, the FBS has to redirect its beams so that UE1 receives the same transmission signature. That is why the beam 1201 is pointing towards it. The FBS will successfully target UE1, but other UEs (e.g., UE2) can still differentiate between the real BS and the FBS since the radiation pattern changes.

Assuming that the secondary station may know its location and the radiation pattern (in which direction the different beams of base station point when broadcasting the SSBs with different identifiers), the secondary station can derive what the expected received radiation pattern should be. Typically a secondary station 1200 has an omnidirectional antenna. For instance, if a secondary station knows its position and that the beam 1201 points towards it, the beam 1203 goes in the opposite direction and that the beams 1202 and 1204 go in perpendicular directions, then the secondary station 1100 can expect the biggest signal strength for the beam 1201, the lowest for the beam 1203, and intermediate values for the beams 1202 and 1204. The expected relative signal strength scan be derived from the gain distribution of the antenna for the different beams given the specific position of secondary station 1200 since it can compute its relative position, and with it, it can compute the gain of the antenna towards the secondary station 1200 for the different beams. It can now compare this expected signal with the received signal by computing the cross-correlation. If the signals are aligned, the maximum should be around the zero. If the cross-correlation outputs a maximum much further away than 0, then the primary station can be classified as a potential fake base station.

This method may not always give guarantees or prevents an attacker from attacking a specific target secondary station, but it can reduce the number of devices that can be addressed by a FBS to a much smaller fraction of them reducing the overall risk.

The above method using radiation pattern is described when the UE is in IDLE mode and the UE is acquiring the SI of the base station. This method can also be applied during operational phase (CONNECTED mode) fitting KI #3 in TR 33.809 as follows. During operation, a UE can also keep track of the gNB beams that it is using for its communication. For instance, in an interval of 1 minute, in steps of 10 seconds, while UE was moving, the UE might have seen the following beams:

[B_1, B_32, B_32, B_19, B_45, B_45]

The UE can collect these beam statistics and the timing (e.g., UTC time) and send them to the gNB in a protected manner. The gNB can then compare whether the beams used to communicate with the UE are the same beams that the gNB actually used. If a MitM is in place, this is very unlikely to be the case, and thus, the gNB will detect the MitM presence.

In an extension of this embodiment, a secondary station, for example a UE, sends a report of the collected physical information to the core network. This report can be seen as an extension of Annex E of TS 33.501 for UE-assisted network-based detection of false base station. The network can combine the information of multiple secondary stations (UEs) including the UEs locations and the received radiation pattern signal to estimate where base stations and fake base stations are.

The UE can report the measured beams at a given time and location. For instance, the following data can be included in a UE report to the network: for each time t_i, the location of the UE I_i, and the set of beams measured. A given beam B can include PCI identifier, beam index number, and measured power. Such a report is illustrated as follows:

{{{t_0}{I_0}{B_0_0,...,B_0_n0}},
{{t_1}{I_1}{B_1_0,...B_1_n1}},
...
{{t_k}{I_k}{B_k_0,...,B_k_nk}}}

We note that the above can refer to the beam indexes (SSB index) used during cell acquisition. The above can also refer to beam indexes used during operation.

Since the core network has information from multiple UEs, the core network can use this information to determine the presence of a fake base station, even if the fake base station is targeting a very specific area. To this end, the core network will recreate a map of measurements for the beams associated to a given base station, e.g., the SSB indexes during cell acquisition. If a fake base station tries to spoof the identity of another base station at a close-by position, the fake base station will create a radiation pattern that is not expected. The location of the fake base station can be roughly determined by finding the geometric center of the measured beams.

We note that if a UE moves and wishes to change gNB, the UE can perform a handover. During the handover process, the UE can inform its current gNB it is connected to about its preferred target gNB, including a report of the signal strength of the different beams/gNBs as received by the UE. The current gNB can check whether this measured radiation pattern of the different beams/gNBs is as expected or not. The current gNB might also inform at this stage, knowing UE's location, what the expected radiation pattern is so that the UE can cross-check what is expected with its measured radiation pattern. If an anomaly is detected, the UE can inform the gNB (in the case that the detection is at the UE side) or the gNB can inform the UE about such anomaly and indicate that a different target gNB/beam is preferred.

We note that an attacker running a fake base station at location L_FBS and spoofing the identity of a real base station at location L_RBS might try to prevent a UE from detecting it by placing a beam with a given SSB index at exactly the same position where the real base station is using that very same beam index. Such a UE under such an attack may not be able to detect the attacker since it measures the beam index it is supposed to measure. However, even such an attacker cannot hide if UE and CN work together, for example:

if the false base station wants to prevent being discovered as described in the last paragraph by measurements reported from all UEs, the fake base station should only use that specific beam. If the fake base station uses more beams, the other UEs at other locations are likely to reveal its presence as described above.

But if the false base station uses a single beam in the SSB, the UE will also become suspicious since the UE knows how many beams a base station uses during cell acquisition.

In particular, the network triangulates the signals to estimate the positions of the base stations. The UEs can also report other positioning information from the base stations such as positioning reference signals (PRS) such as signal strength or angle of arrival as described in Solution 22 in TR 33.809-v0.10.0. If the network detects the existence of a fake base station, the network can inform the UE of its presence so that this fake base station is excluded. The network can also take further action.

The process can thus be summarized as:

--- a) UEs send to network measurements of the base stations regarding location (received radiation pattern, UE location, signal strength, angle of arrival,...)

b) While positions do not match, do the following:

b1) take subset of N available UE measurements from the BS stations b11) Network estimates the position of the UEs based on the chosen subset and compares it with the shared UE position.

b12) Given the estimated positions of the UEs, and the reports from the UEs, the network can estimate the positions of the base stations by using either signal strength & angle of arrival, or using triangulation with received radiation pattern, or combining both approaches

---

We note however, that if the network informs the UE and the UE takes action on this information about FBS, e.g., excludes the base station, then the UE is prone to certain types of attacks. In particular, an attacker can misuse this behavior to attack the system. In particular:

Fake data attack: If a honest base station does not broadcast its positioning information, e.g., PRS, the attacker can mount a FBS that rebroadcasts its signal including this PRS. This will lead the UE to communicate wrong positioning information to the network. This wrong information can make the network think that the honest base station is at the wrong location leading to a misclassification of the honest base station as a fake one.

Replay data attack: If a fake base station just rebroadcast the signals of a honest base station, UEs will also pick up contradictory positioning signals that can also lead the network to misclassify a honest BS as a fake one.

In these circumstances, the operation of the network, and also the operation of in Solution 22 in TR 33.809-v0.10.0, may be adapted in the following way:

Solution to fake data: The network has to be aware of the information that a base station actually broadcast (e.g., PRS, yes or no) and take it into account when determining whether a base station is fake or not. If the network is certain that a base station does not broadcast some information, then this measurement report from a UE should be removed by adding a new step between above steps a) and b) in which the network checks whether the base station broadcast the type of received information, and if not, the data is removed. At this stage, the network can deduce that either the UE is under attack or a malicious node is broadcasting false information from the base station. The case of a malicious UE can be discarded if multiple UEs in the same area report the same information.

Solution to replayed data: If a report contains contradictory information about the same base station, e.g., radiation patterns that are linked to the same base station but mapped to at least two different positions, then the network should split the network into multiple different base stations being suspicious that an attacker running one or more FBS might be involved. This split is done in step b1) above.

Therefore, more generally, it is possible to adapt the previously discussed embodiments to include the step of estimating a radiation pattern of a primary station, and comparing the estimated radiation pattern to a reference radiation pattern of the primary station. Further, upon determination that the radiation pattern does not match the reference pattern, it could include the step of determining a location of a potential fake primary station on the basis of the determination. Optionally, determining the location of the potential fake primary station includes comparing the index of the beam included in the radiation pattern with a reference. Although it is advantageous to perform these steps on the network side (or in a specific dedicated entity) based on measurement reports from UEs, some or all of these steps could be performed by a UE as well.

In a further variant, an entity (possibly placed in the network or the primary station) receives a measurement report including some indication of an estimated radiation pattern, and the entity analyzes the received measurement report including some indication of a radiation pattern to determine whether a Fake primary station is present in the network. This determination can be done by comparison with a reference radiation pattern or by monitoring changes over time, or by cross checking measurement reports from a plurality of different UEs.

Additionally, it is an option for the secondary station to monitor PBCH parameters when estimating the radiation patterns. As an example, the monitoring may include measuring the strength of the PBCH DMRS for each SSB.

An alternative or complementary solution is to keep a log of primary stations in a well-known data base that could be denoted as base station log (BSLog) or multiple data bases operated by multiple parties. One option is to construct this base station log based on information owned by the network operators who know the location and configurations of the base stations. A secondary station can then request the BSLog information of the primary stations located close by.

Figure 13:
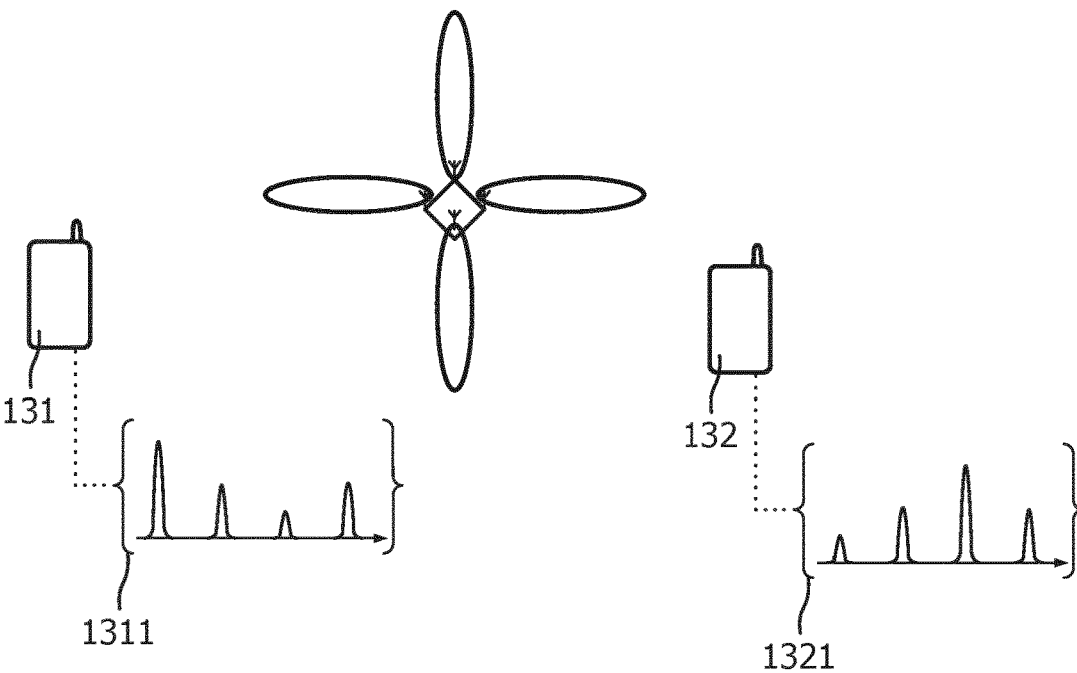
FIG. 13 is a block diagram representing a network in accordance with a second example of the fifth embodiment.

A further option is to build public BSLogs where users can submit their measurements or the scanned base stations and network operators can also publish the available base stations. Such data bases exist, even if they do not seem to be widely extended. An example of them is mastdata. If such a BSLog exist, a UE can verify whether the estimated location of the primary station matches the location of this primary station included in the BSLog providing additional assurances. Since the decisions of the secondary station depend on the contents of the BSLog, it is fundamental the BSLog is trusted. Increased trust can be achieved if there are multiple BSLogs that can be externally audited. In order to avoid that the BSLog manipulates its entries, the entries can be combined by means of a Merkle tree verification tree where the tree root is made public. This makes sure that a BSLog cannot modify certain entries at a later point of time. This technique is used in Certificate Transparency as specified in rfc6962. Another option is to use a type of block chain technology. Thus, information submitted to a BSLog can be used to verify and estimate the location of the primary stations by taking into account the submitted signal strength and the SBs measurements. For instance, if:

UE1 131 is at location (x=0, y=0), measures a given radiation pattern 1311 (FIG. 13). This gives an indication of which beams is pointing towards UE1 131.

UE2 132 is at location (x=2X, y=0), measures a given radiation pattern 1321 (FIG. 13). This gives an indication of which beams are pointing towards UE2 132. With this information UE1 131 and UE2 132 together can determine whether the BS is between them in x<0 or in x>2X.

Then, the BSLog can determine that measurements reported by UE1 and UE2 and any other UEs match since the given an estimation for the location of BS1 that matches, also taking into account the measured signal strength and direction.

UEs do not need to transmit their measurements immediately or always, but they can do it with a certain delay to protect their privacy. They can also add some noise to the measured radiation pattern to protect their privacy.

The above can also be extended with the usage of digital signatures. In this case, the BSLogs only accept measurements from BSs including a valid digital signature. In a similar way, when a UE receives SI from a BS, the UE checks whether the received SI, including the used public-key, matches with information available in public BSLogs.

The description so far has been about fake base stations defined as base stations run by an attacker. A different notion of fake base station is given in "SteaLTE: Private 5G Cellular Connectivity as a Service with Full-stack Wireless Steganography" available online at https://arxiv.org/abs/2102.05606 since Feb. 10, 2021. In this attack, UEs and base station might have some specific hardware.

System information broadcasted by a base station might be replayed, e.g., by means of a MitM device. There are different types of MitM attackers:

A. An RF repeater is a device placed by an attacker between a UE and a gNB. The RF repeater rebroadcasts the RF signals between UE and gNB without processing the messages. It is assumed that this RF rebroadcasting is done without incurring noticeable communication delays that, e.g., affect the time synchronization and allocated communication resources between UE and gNB. An RF repeater is considered an active attacker since it might be used to create a communication link between UE and gNB that can be released at a later point of time leading to a Denial of Service attack.

B. A MitM is a device consisting of a Fake Base Station (FBS) and a Fake UE (FUE) placed by an attacker between a UE and a gNB. The MitM device does not just rebroadcast the messages, but it forwards the messages. This means that the FUE and FBS have to process the uplink and downlink communication receiving, processing, and retransmitting the messages. The MitM can also inject and modify messages. It is assumed that message forwarding and processing incurs communication delays that affect, e.g., the time synchronization between UE and gNB. A standard MitM device is an active attacker since it can inject, modify and drop messages.

C. A stealthy MitM is a device consisting of a Fake Beam and a FUE placed by an attacker between a UE and a gNB. The Fake Beam is a base station beam that mimics one of the beams of the gNB at a location where this gNB beam has low or no coverage. By doing this, the UE connects to the stealthy MitM and hides himself. From this point of view, this attack can be considered as a simpler version of the Physical Signal Overshadowing Attack on LTE. This active attacker is called stealthy since it can hide himself better than a standard MitM: the attacker can transmit a very specific Fake beam at a location close to the actual gNB without being noticed by UEs or the CN even if the UEs or CN check the expected gNB PCI or associated beam number.

Figure 23:
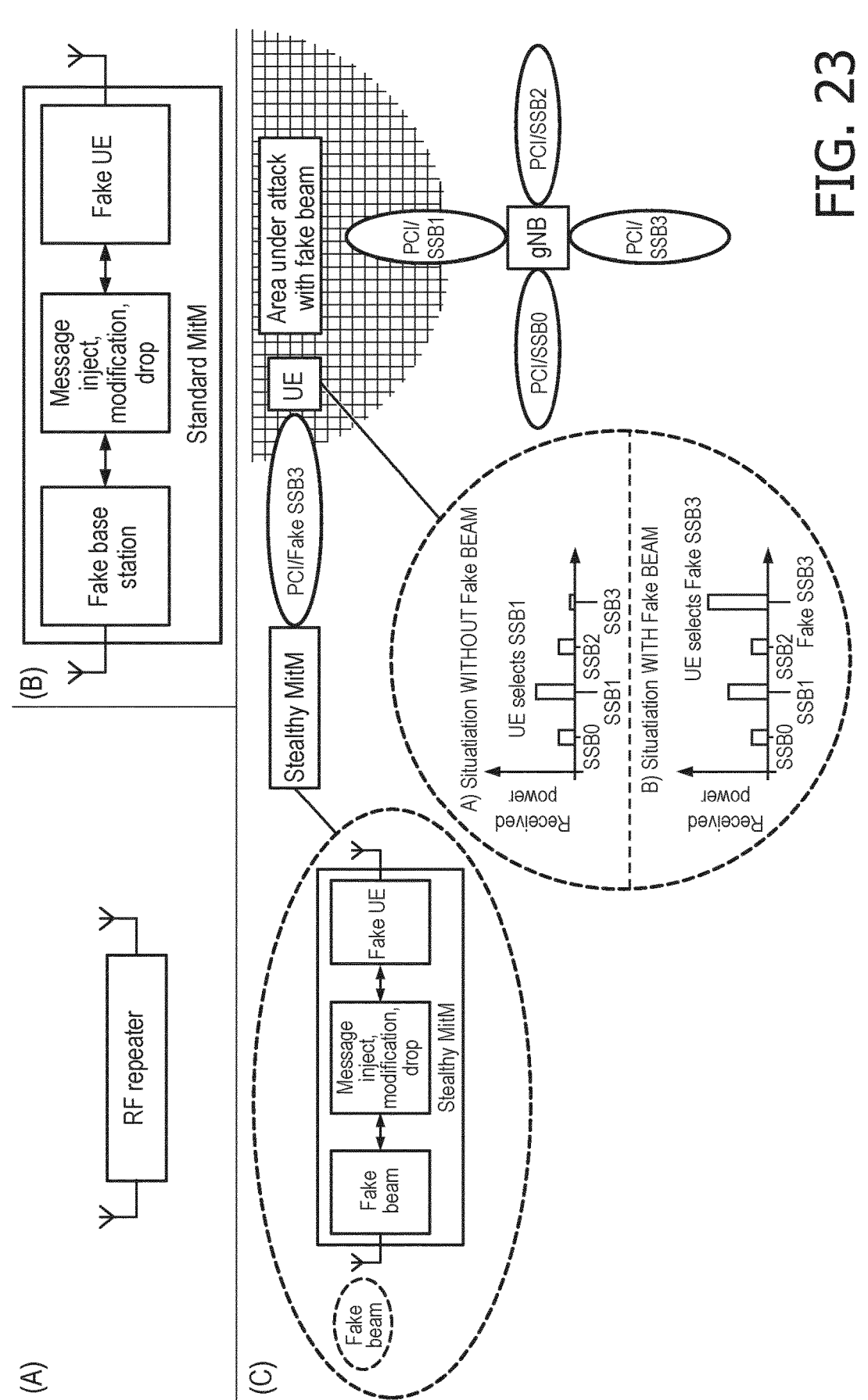
FIG. 23 is a block diagram depicting three types of MitM devices and a specific attack scenario using the MitM devices.

These three types of MitM devices are depicted in FIG. 23. FIG. 23 also shows a specific attack scenario using the stealthy MitM.

FIG. 23— MitM Devices and attack scenario using the stealthy MitM: an attacker places a fake beam with SSB=3 in the area covered by gNB's beam with SSB=1. Since SSB=3 is also a valid beam but in a different area, it is not feasible to detect the attack by just checking the PCI.

In the case of the stealthy MITM attacker, the above attack can be mitigated if the gNB signs the SSB and the UE verifies it. The verification step might include checking the location where the SSB should be received.

In the case of an attacker using an RF repeater, the UE might monitor whether a strong signal of a gNB keeps appearing and disappearing while the UE remains static. If this situation happens, this might indicate that an attacker is using an RF repeater to disrupt the operation (DoS) of one or more UEs, e.g., by switching on the RF repeater, waiting for UEs to join through it, and then switching it off. Thus, in accordance with still another embodiment, a secondary station may consider to lower a preference level of a primary station upon determination that said primary station may be unreliable. Said determination may include determining that the base station is switching on and off over a period of time. Thus, in a variant of this embodiment, a UE should monitor the synchronization signals of gNBs following such a pattern and if such a pattern is detected, then the UE should deprioritize the gNB, in other words, decrease the preference of joining such a gNB even if its transmission power is suddenly much better once again. This detection algorithm might benefit of considering:

Whether the UE is moving or not. If the UE knows that it is moving, this might be a cause of a changing received signal power. The detection algorithm might make an exception in such a case, and still keep a high priority for such a gNB.

Whether the received gNB synchronization signal belongs to a mobile base station. If it belongs to a mobile base station, this can be a source of a changing received signal power. The detection algorithm might make an exception in such a case, and still keep a high priority for such a gNB.

Thus, more generally, it can be proposed a method for a secondary station to detect a suspect device in its vicinity, wherein the method comprises the secondary station detecting changes in a link characteristic from a target device over a time period, the secondary station determining the target device as suspicious if the changes in link characteristic are in discrepancy with the location of the secondary station over said time period.

Similarly, it is proposed a secondary station including a receiver coupled to a controller adapted to detect changes in a link characteristic from a target device over a time period, the controller of the secondary station determining the target device as suspicious if the changes in link characteristic are in discrepancy with the location of the secondary station over said time period.

In an example, the link characteristic is a strength of link with the target device.

In another example, the secondary station reports to a known primary station the presence of the suspect device. The reporting may include a location estimate of the suspect device.

In another variant of the fifth embodiment, the location parameter is determined by checking whether an encryption key used by the primary station corresponds to an encryption key allowed to be used locally. In a further variant, the signal is a configuration message from a primary station at a secondary station, and the configuration message includes at least a signature for authenticating the configuration message. In this case, the secondary station authenticates the configuration message by > checking whether the private-key associated to the public-key required to verify the message is authorized to sign configuration messages in the current location of the secondary station or in the current PLMN,
> if authorized, verifying the signature.

In this variant, the Signature Generator's public-key may also be associated to certain rights of the private key, for instance, rights to sign System Information of base stations in certain location only. Thus, next to checking the validity of the signature and the timing, the secondary station also has to check whether the private key used to create the signature has rights to be used in its current location. For instance, if a UE has the public key of a Chinese network operator and it detects a base station of requiring that key to verify SI of a base station when the UE is in the United States, then the UE should block that base station. This ensures that an attacker cannot, e.g., compromise the private key of an operator and use it to create fake base stations somewhere else. Similarly, multiple pairs of public-private keys can be used by a network operator, each pair associated to a different location. This limits the possibility of wide attacks.

To address this, a cell scanning procedure could be extended to check the location-related signing rights of a private key (in the following pseudo code):

```
For each of the N cells:
acquire MIB and SIBs;
    If there is no digital signature, mark the cell as unprotected.
If there is digital signature,
        if the public-key is allowed to sign SI in the current
        location/PLMN/...,
    then verify the digital signature and time counter;
    if both digital signature and time counter are good, proceed with the
cell
```

-continued

```
    and break; /* this
is the usual case, i.e., in the absence of an attacker */
    if either digital signatures or time counter is bad, mark the signature as
    bad and store the
time counter;
    go to the next cell;
    End of for loop;
```

Similarly, it is recommended that Signature Generator uses multiple key pairs for different locations to reduce the impact in case of a security breach. The secondary station can check whether the correct key pair is used at its current location.

Regarding the verification of the access rights associated to a public-key (e.g., is a public-key authorized to verify information at a given location, is a public-key authorized to verify SI from a given PLMN, etc) can be done either before or after signature verification. Doing it before signature verification has the advantage of being faster and more energy efficient, similarly to the freshness verification.

In connection to the various embodiments discussed earlier, a key issue refers to the provisioning of the trust anchors in secondary stations. This refers to the public-keys used to verify the signed information. A first option consists in installing this information when the secondary station joins the core network for the first time. This means that the first connection might be prone to False Base Stations, but this danger goes away afterwards. This is a suitable solution if a single pair public-private key is used by an operator. But it becomes more difficult to use if the operator wants to use multiple key pairs, e.g., depending on the location. This also becomes an issue when the public-keys are only valid during a given period of time.

In this improvement, it is considered that the pair of public/private keys at the Signature Generator are not signed and are not embedded in a certificate, e.g., signed by a CA. This is a natural extension if it is desired that a secondary station can connect through primary station stations managed by multiple network operators.

A second option consists in using identity-based signatures where the public-key depends on several known parameters including operator and location. The first parameters can be derived from information available in SIB1:

```
SIB1 ::=                         SEQUENCE {
    cellSelectionInfo                SEQUENCE {
        q-RxLevMin                       Q-RxLevMin,
        q-RxLevMinOffset                     INTEGER (1..8)      OPTIONAL, -- Need R
        q-RxLevMinSUL                        Q-RxLevMin          OPTIONAL, -- Need R
        q-QualMin                        Q-QualMin           OPTIONAL, -- Need R
        q-QualMinOffset                      INTEGER (1..8)      OPTIONAL -- Need R
    } OPTIONAL, -- Need S
    cellAccessRelatedInfo                CellAccessRelatedInfo,
CellAccessRelatedInfo ::= SEQUENCE {
    plmn-IdentityList                PLMN-IdentityInfoList,
    cellReservedForOtherUse              ENUMERATED {true} OPTIONAL, -- Need R

...

}
PLMN-IdentityInfo ::= SEQUENCE {
plmn-IdentityList                    SEQUENCE (SIZE (1..maxPLMN)) OF PLMN-Identity,
trackingAreaCode                     TrackingAreaCode OPTIONAL,
ranac RAN-AreaCode                   OPTIONAL,
```

-continued

```
cellIdentity              CellIdentity,
cellReservedForOperatorUse          ENUMERATED {reserved, notReserved},
...
PLMN-Identity ::= SEQUENCE {
mcc                       MCC OPTIONAL, -- Cond MCC
mnc                       MNC
}
```

These parameters include the PLMN identifier since it identifies the owner of the private key; location information such as the trackingAreaCode. However, this information could also be enhanced with location information (GPS coordinates) to better determine the location of the primary station and mobility aspects of the primary station: is it static or does its location change (e.g., if placed in a bus). Timing information is not included in the generation of the public-key since it is verified afterwards.

In the already discussed embodiments, it has been described so far solutions focussing on avoiding False Base Stations. However, another type of attacks a network could be victim of is A Man in the Middle (MitM) attack. These involve relay nodes that can just forward the information of a real primary station and may not be detected by some the previous embodiments. It has been proposed to include and sign a Time_Difference field so that a secondary station receiving a message rejects it if the current time is older than Transmission_Time+Time_Difference. However, this may not always be good enough because it is difficult to estimate the value of Time_Difference.

Figure 14:
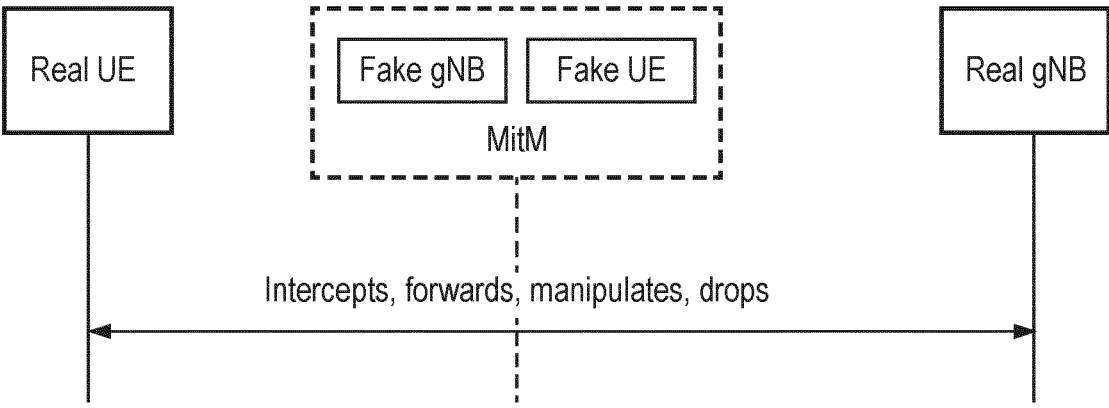
FIG. 14 is a block diagram representing a network in accordance with a sixth embodiment of the invention.

A possible option to avoid MitM attacks is to use signed cell identifiers (PCI). Thus, primary stations with a duplicated PCI are removed. However, this approach has some issues as well. First, a secondary station might not be able to detect or receive the signal of a real base station. For example, as shown on FIG. 14, the attacker might use a False UE with a very sensitive/powerful antenna that allows it to get the signal of primary stations that are out of range from the secondary station. This is a so call range extension attack. Second, the attacker might just jam the signal of the real base station at the secondary station. And third, as indicated above, removing duplicated primary stations without further checks opens new ways to attack the multi-cell time synchronization method.

A sixth embodiment thus proposes a solution that is much more robust. In accordance with this sixth embodiment, the Signature Generator signs the map between a primary station's SFN and the Signature Generator time. Furthermore, the secondary station's clock is in tight sync with the clock of the Signature Generator. If these pre-conditions are fulfilled, the secondary station receives signed system information from the primary station, verifies its signature, verifies the time, verifies the SFN values, and checks whether the broadcasted data has been broadcasted in the verified SFN values.

Thus, it is proposed in accordance with the sixth embodiment a method for checking authenticity of configuration messages, the method comprising receiving a configuration message from a primary station at a secondary station, wherein the configuration message includes
    a timing correspondence indication between a clock value at a signature generator and a system frame numbering used by the primary station,
    a frame number indication identifying the frame during which the second configuration message was sent and
    a signature for authenticating the configuration message.

Furthermore, according to the method of the sixth embodiment, it further includes authenticating the configuration message by
    checking that the frame number indication corresponds to the frame number in which the configuration message was received,
    comparing the time of reception of the configuration message with the estimated time of transmission based on the timing correspondence indication and
    verifying the signature based on the configuration parameter value.

Alternatively, the method may comprise
    receiving a first configuration message from a primary station at a secondary station, wherein the first configuration message includes
        a timing correspondence indication between a clock value at a signature generator and a system frame numbering used by the primary station and
        a first signature for authenticating the first configuration message,
    receiving a second configuration message including at least one configuration parameter value, a frame number indication identifying the frame during which the second configuration message was sent, and a received second signature,
    authenticating the second configuration message by
        checking that the frame number indication corresponds to the frame number in which the second configuration message was received,
        comparing the time of reception of the second configuration message with the estimated time of transmission based on the frame number indication and the timing correspondence indication and
        verifying the received second signature based on the configuration parameter value.

In these embodiments, the first configuration message may include a cryptographic key to be used to authenticate the received second signature. Further, similarly to some of the previous embodiments, the first configuration message includes static configuration parameter values, and the second configuration message includes variable configuration parameter values.

In order to maintain a high level of security, the first configuration message may have a first limited time validity, being equal to one of the following: the time required for the subframe numbering to span around its whole range of values, the time required for an hyperframe numbering to span around its whole range of values.

In an example of the sixth embodiment, the second configuration message may have a second limited time validity, being equal to one of the following: the time required for a predetermined number of the most significant bits of the subframe number to change, or the time required for the six most significant bits of the subframe number to change, or 160 ms, or 80 ms.

Similarly as the already discussed embodiments, the second signature may generated or verified by means of one of an ECDSA, a hash chain.

Some aspects of the general idea of the sixth embodiment can lead to a high overhead on the Signature Generator, since it requires signing the dynamic System Frame Number fields of all primary stations. This means that the Signature Generator needs to sign many messages. This can be optimized, e.g., as follows:

a) the static fields of gNB are signed with digital signature parameters providing long-term security including:

a. when, based on DSnF time, the gNB SFN equal 0. This is denoted reference_SFN_gNB.

b. the public-key that is used to verify dynamic fields: current_dynamic_fields_public_key.

b) The signature validity for the signed static fields equals 10"240 ms, i.e., the time it takes for System Frame Numbering to wrap around.

c) The dynamic fields of a primary station are signed with private key current_dynamic_fields_private_key. This signing key can be specific for a primary station.

d) The signature validity for the signed dynamic fields equals a frame multiple, e.g., the time it takes till a new MIB is broadcasted or the time it takes till the 6 most significant bitts of the SFN, which are included in the MIB, change (160 msec).

e) The secondary station clock is in sync with the clock of the Signature Generator.

If these pre-conditions are fulfilled, the secondary station receives from a primary station:

a) The static system information of the primary station signed by the Signature Generator. The secondary station verifies its signature, verifies the time, and obtains reference_SFN_gNB and current_dynamic_fields_public_key.

b) Dynamic fields signed with current_dynamic_fields_private_key. The UE can for example then:

1. verify signature, 2. check the dynamic fields SFN, 3. check whether the received system information has been received in the currently verified SFN, 4. check whether $$\text{reference\_SFN\_gNB} + 10*\text{SFN} = \text{current\_UE\_time} \qquad \text{(Eq. 1)}$$

This protocol solves the MitM attack because:

a) if the FBS keeps the same reference SFN reference time as the primary station, it will have to change the values of SFN in the broadcasted system information since it is not capable to process them without delay.

b) If the FBS introduces its own SFN reference time, then check in Eq 1 will fail.

This design is robust because it limits the validity of the signature of the static fields to around 10". This avoids the need of revocation lists. Moreover, it limits the validity of the current_dynamic_fields_public_key. Thus, it is possible to use a lightweight scheme.

Further, it limits the validity of dynamic fields to a few tens of milliseconds. This provides a solution to avoid MitM relay nodes, because when the MitM replays the message, the MitM will process it and send it again and this takes some time.

If the MitM has the same SFN reference system as the real BS, then this requires changing the SFN fields in the MIB since it is transmitted later, and the verification fails therefore. If however the MitM does not change the SFN so that the signature can be verified, the FBS will need to use its on SFN reference time so that the SFN counters fit. But this will not match with the signed SFN_Reference_time. So the check in Eq. 1 will fail. The MitM node could wait 10.24 seconds to rebroadcast the information using the same SFN reference time, but this may not work if the signed static fields are valid for only this period of 10.24 s.

Solutions based on signing of a time counter such as UTC time or SFN require time synchronization. If such time synchronization is not good enough or difficult to achieve, this solution (and also solutions #7 and #11 in TR 33.809-v0.10.0) might still be vulnerable to replay attacks. In this case, the following embodiment can be realized where we assume that the DSnF signs pairs of short-term public/private keys for the base stations that are used for a short period of time (e.g., 10.24 s). The base stations broadcast their short-term public-key together with the system information.

a) The base station broadcasts SI including its short-term public-key b) If the UE decides to join a base station, the UE generates a secret K and a nonce and encrypts both of them with the short-term public-key of the base station. The UE could also generate a single secret value from which K and nonce are derived, e.g., with a key derivation function. The UE sends this information as soon as possible in the connection association. For instance, during the random access procedure. The goal in step b is to share a key between UE and base station using the public-key of the base station. The UE might use other algorithms for this purpose, e.g., a Diffie-Hellman key exchange or a KEM.

c) The base station, upon reception of the encrypted message, decrypts the message, obtains the nonce, and signs it with its short-term private key. The base station sends this message to the UE. The base station sets the key K as the one to be used in combination with a cryptographic CRC technique. In step c, the base station provides proof of the reception of the encrypted key to the UE by signing the nonce. Alternatively, the base station can compute other authentication token, e.g., it might compute a message authentication code (MAC) with the received key using the received nonce and send this back to the UE for verification. MAC(K, Nonce). The UE might also send the least significant bits of this MAC, e.g., the least 32 significant bits. The UE might also send the hash of the received key.

d) Upon reception of the last message, the UE verifies the signature (authenticity) and whether the nonce corresponds to the one that the UE had sent to the base station. If these two checks hold, the UE sets key K as the one to be used in combination with the cryptographic CRC technique or with the "Enhanced mechanism for detecting fake base station attacks" described in our co-pending application referenced 2020P00937EP under priority of EP21150019.4.

At this point of time, both UE and gNB have verified that they have a common secret. However, a MitM might still be in the middle who has been just forwarding the packets. In the following communication between UE and base station, the CRC in the MAC layer is replaced by CRC'=MessageAuthenticationCode(CRC|BlockID, K) where the BlockID is an identifier that uniquely identifies the resources (time/frequency) used in the communication. This technique follows the ideas of the cryptographic CRC described in more details below. If the identification of time/frequency resources is achieved with a very fine granularity, then the achieved protection will be better. For instance, time should be identified at as short times as mini-slot to make sure that an attacker cannot replay mini-slots within an allocated slot. If a MitM is in place, the base station will notice that the cryptographic CRC verification of the incoming messages from the UE fails at MAC layer. This gives an indication to the base station of the problem that can notify the UE, notify the network, and potentially close the communication.

We note that in the last step d) above, a base station might sign using the new short-term private key that might have just been replaced. Thus, a UE might need to perform two checks, one with the current short-term public-key of the base station that it has, and if this check fails, the UE will need to wait till the new signed short-term public-key is received, and then redo the check.

We note that this procedure, standalone, can also be beneficial if the cryptographic CRC is applied standalone since it allows UE and base station to agree on a common key without requiring the establishment of AS security. This solution is also suitable for devices that do not run Access Stratum (AS) security such as CIoT devices. We also note that the above procedure can be adapted to solutions #7 and #11 in TR 33.809-v0.10.0 to achieve replay protection.

Regarding the cryptographic CRC, the communication protocol may define data blocks on a link between the base station and the user device, while the data blocks comprise user data and checksum fields, and checksums for error detection in the user data in the data blocks. The user device may include a transceiver, a processor and an integrity unit for providing data integrity of the data blocks. The processor can be arranged to manage data transfer on the link to the base station using link data regarding a sequence of the data blocks across the link, the link data being different for each data block in the sequence. After a certain period in time, the link data may repeat, e.g. due to frame numbers using a limited number of bits. The data blocks in such a repetition period are considered a sequence of data blocks with respect to the integrity protection. The processor can be further arranged to obtain a secret integrity key that is shared with the base station.

The integrity unit may be configured, for a respective data block, to cryptographically process, while using the secret integrity key, a combination of the checksum for a predetermined one of the checksum fields and a predetermined part of the link data. Then the cryptographically processed combination may be truncated to the length of the checksum as defined by the communication protocol if need be, and the truncated cryptographically processed combination, simply called truncated combination hereafter, is used for error detection and integrity protection. Thereto, the truncated combination is inserted in the predetermined one of the checksum fields before transmitting a data block and compared to a value in the predetermined one of the checksum fields after receiving a data block.

The above features have the following effects. The truncated combination enables to detect transmission errors and integrity errors by performing the same cryptographic processing at the sender and the receiver side, and subsequently comparing the results at the receiving side. Advantageously, as the truncated combination is inserted in a checksum field that originally contained the checksum, no additional bits are required for data transfer on the link when compared to a legacy communication system not having such integrity protection, while transmission errors are equally detected as the same checksum is used at the transmitting side and is recalculated at the receiving side.

In more details, in a communication system, the communication protocol defines data blocks on a link between the base station and the user device. The data blocks have user data and checksum fields, while the checksums are for error detection in the user data in the data blocks. The cellular network provides wireless communication for mobile devices across at least a regional area.

A user device has a transceiver arranged for transceiving according to the communication protocol, and a processor arranged to manage data transfer on the link to the base station using link data. The link data relates to a sequence of the data blocks that is transferred via the link. The link data is different for each data block in the sequence, while some parts may repeat for a subsequent sequence. Various examples of such link data have been presented above for an exemplary 3GPP system.

A processor is further arranged to obtain a secret integrity key that is shared with the base station. Various mechanisms for establishing a secret key between two devices are known and may be used for securely exchanging such key data.

Diffie-Hellman is a well-known technique for establishing a secret key between two parties, where the communication between the parties for establishing the secret key does not reveal any information to third parties on the established secret key. The two parties each use their own public/private key pair and exchange the public key with each other. Each party is able to compute the secret key using its own private key and the other party's public key and possibly some other information, e.g. a nonce (random number) from each party. Each party may generate a key pair anew each time it performs Diffie-Hellman or it reuses an older key pair.

The user device may further have an integrity unit for providing data integrity of the data blocks, the integrity unit being arranged to perform the following processes for a respective data block. First, the integrity unit cryptographically processes, while using the secret integrity key, a combination of the checksum for a predetermined one of the checksum fields and a predetermined part of the link data. The cryptographic processing may, for example, be encryption or the application of a hash-based message authentication code (HMAC). Various examples are described below. The checksum may be calculated as defined in the communication protocol, and may be concatenated with a block number or block address, and optionally further link data, i.e. a predetermined selection of link data that varies from block to block. Further such combination may include padding data or a salt. A salt is random data that is used as an additional input to a cryptographic function that "hashes" data, such as a password or passphrase. Salts are closely related to the concept of nonce. The primary function of salts is to defend against dictionary attacks or against its hashed equivalent, a pre-computed rainbow table attack. If padding data or a salt is used, the value has to be shared between the base station and the user device. The value to use may be defined in a specification, e.g. a 3GPP specification. Alternatively, the base station may also send the value to use to user devices in e.g. a System Information Block. The value to use may be the same for all user devices or different per user device. Various examples of suitable varying link data are described below. So, a combination string of bits of a required length is formed to be cryptographically processed.

Secondly, the integrity unit truncates the cryptographically processed combination to the length of the checksum, which length is defined by the communication protocol. By said truncation, the truncated cryptographically processed combination now fits in the checksum field of the checksum as originally intended. For example, for a checksum field of n bits, truncation may be using the first n bits, the last n bits, or any predetermined selection or permutation of n bits of the cryptographically processed combination.

Finally, the integrity unit uses the truncated combination for error detection and integrity protection by inserting the truncated combination in the predetermined one of the checksum fields before transmitting. Similarly, while receiving data, the integrity unit uses the truncated combination by comparing a received value in the predetermined one of the checksum fields with the truncated combination as calculated on the received data and respective corresponding predetermined link data. When the received value is equal to the newly calculated value, the integrity of the data covered by the checksum is verified, while also ensuring that the data is without errors. Otherwise, even in the event of a single bit error or a single modified user data byte, the checksum would be different. Henceforth, the cryptographically processed combination will be very different. So, both transmission errors and intentional modifications of the user data will result in a different truncated cryptographically processed combination. So, manipulation of the user data during transmission, a so-called man-in-the-middle attack, is detected using the same number of bits from the checksum field. Also, the insertion of extra data by a man-in-the middle is made much more difficult because of the difficulty for the man-in-the-middle to guess the correct truncated cryptographically processed combination.

In a further example of the above embodiments, it is proposed a mechanism which uses a Public Key Cryptography without requiring tight time synchronization.

Generally, the method of this example is a method for a secondary station to obtain a time reference in a cellular network, the method comprising receiving a plurality of system information, SI, messages from a plurality of primary stations, said SI messages including each a respective time reference information related to the corresponding primary station, checking the validity of a received signature for each of the primary stations and of the time reference, exchanging a key with one of the primary stations determined as valid, and using a MitM detection process immune to loose synchronization to determine if the selected primary station is genuine.

This example also includes to a secondary station comprising a transmitter and a receiver and a processor adapted to receive a plurality of system information, SI, messages from a plurality of primary stations, said SI messages including each a respective time reference information related to the corresponding primary station, check the validity of a received signature for each of the primary stations and of the time reference, exchange a key with one of the primary stations determined as valid, and use a MitM detection process immune to loose synchronization to determine if the selected primary station is genuine.

A MitM detection process immune to loose synchronization may involve, e.g., the use of a Cryptographic CRC for exchanged messages.

This solution may require the same settings as in the DSnF solution including the fact that:

1. the base stations broadcast signed SI signed by the DSnF.

2. The UE has corresponding trust anchors to verify signed SI broadcasted by base stations.

3. the DSnF signs a public-key associated to the base station and that the base station uses the corresponding private-key to sign dynamic fields in the SI.

This solution also requires the Cryptographic CRC (C-CRC) solution mentioned above. The C-CRC solution allows UE and gNB to drop any replayed messages.

Figure 15:
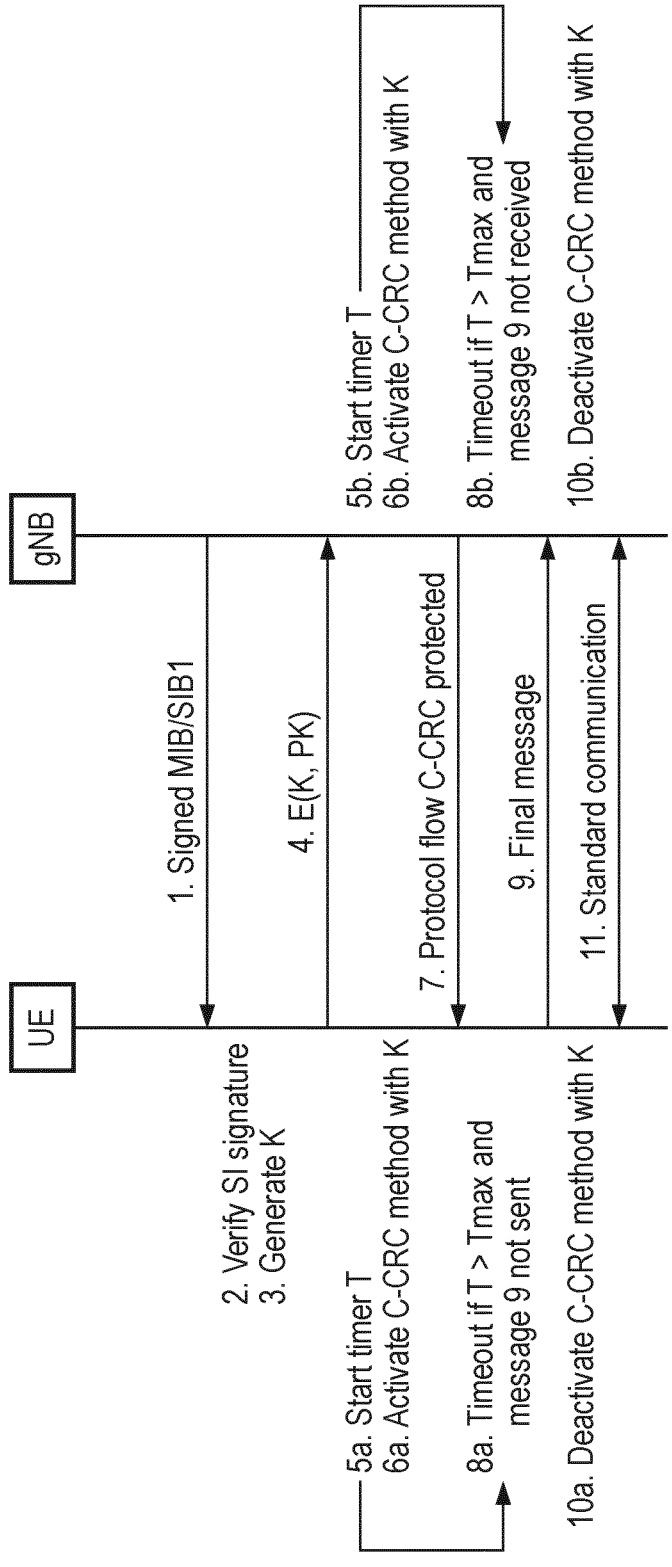
FIG. 15 is a time diagram showing an alternative protocol of the successive messages and corresponding signatures in accordance with a further embodiment of the invention.

The protocol flow is depicted on FIG. 15 and is as follows:

1. gNB broadcasts signed system information.
2. UE verifies the validity of the digital signature, verifying the SI.
3. UE generates symmetric-key K in a secure way.
4. UE sends K to gNB in a secure way by encrypting it with the public key of gNB.
5. a. UE starts timer Ta after sending message 4.
   b. gNB starts timer Tb after reception of message 4.
6. a. UE activates C-CRC method using key K after sending message 4.
   b. gNB activates C-CRC method using key K after reception of message 4.
7. Standard protocol flow but protected with C-CRC.
8. a. If Ta>Tmax and message 8 has not been sent, the UE determines the presence of a MitM, and proceeds to search another base station.
   b. If Tb>Tmax and message 8 has not been received, the gNB determines the presence of a MitM and drops the communication.
9. Final message sent by the UE confirming that no-MitM has been detected.
10. a. UE deactivates the C-CRC method after sending message 9.
   b. gNB deactivates the C-CRC method after receiving message 9.
11. Standard communication.

It is to be noted that Message 4 can be RRCSetupRequest. Message 9 can be NAS Security Mode Complete. Messages 7 include RRCSetupComplete and NAS handshake. Details can be specified during normative phase.

Further, the C-CRC solution replaces the standard CRC at MAC layer. This means that if there is a MitM forwarding, modifying, or injecting messages (step 7), those messages will be dropped by UE and gNB. The MitM does not have access to K, and thus, it cannot compute the C-CRC correctly.

A variant of the previous example allows to reduce the risk of a downgrade attack, i.e. an attack simply based on the false pretends that a device is not compatible with the latest version of the protocol. This kind of attacks makes it abandon a high-quality mode of operation (e.g. an encrypted connection) in favor of an older, lower-quality mode of operation (e.g. cleartext) that is typically provided for backward compatibility with older systems.

The solution assumes the same settings including:
1. the base stations broadcast signed SI,
2. the UE has corresponding trust anchors to verify signed SI,
3. K-SIGPrivate, used to sign the SI, is specific to the Tracking area.

Figure 16:
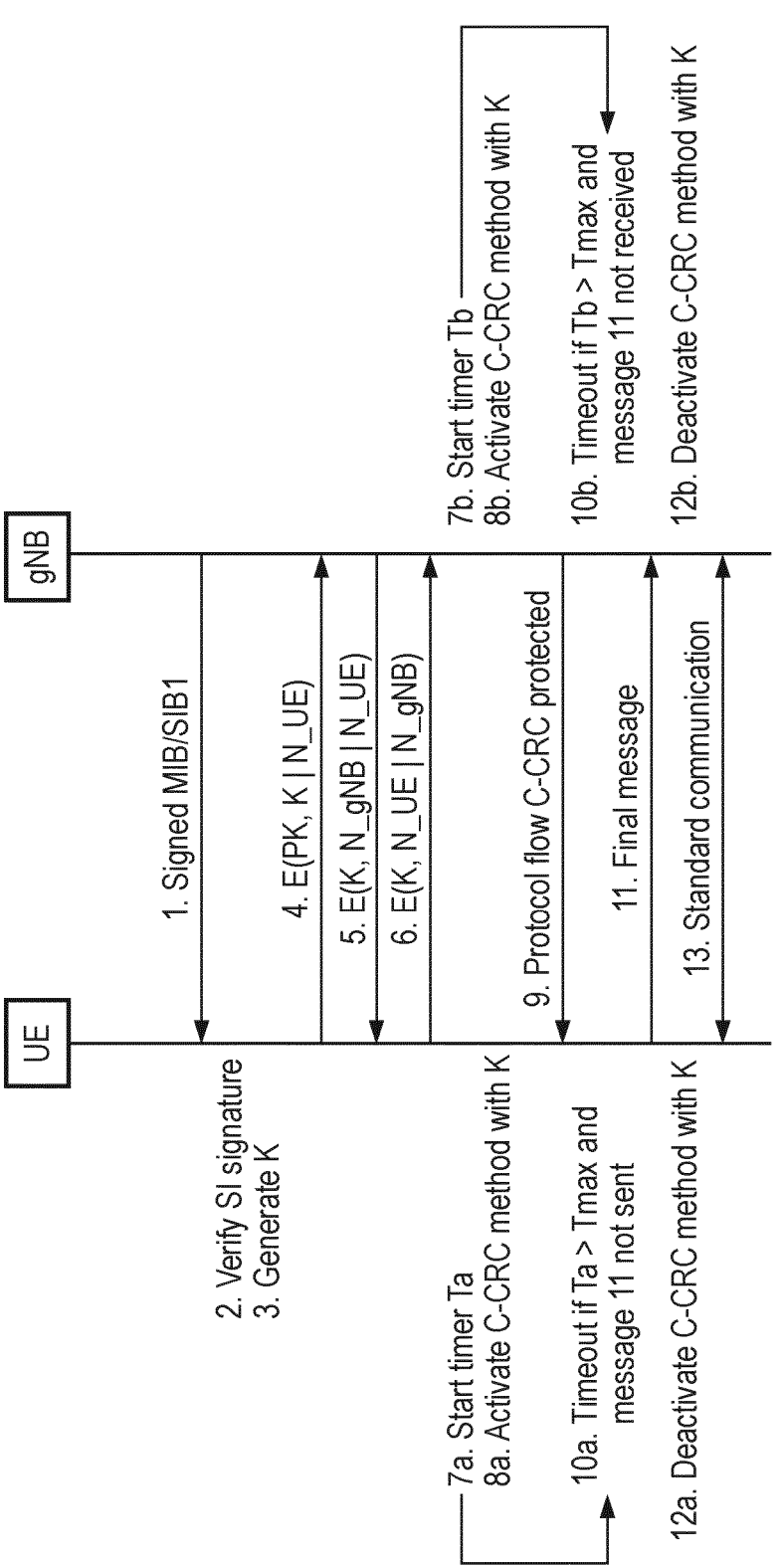
FIG. 16 is a time diagram showing an alternative protocol of the successive messages and corresponding signatures in accordance with a variant of this further embodiment of the invention.

This solution also requires replacing the CRC at MAC layer with the Cryptographic CRC (C-CRC) as described earlier:

C-CRC=MessageAuthenticationCodeComputation(K, CRC|blockID)

where MessageAuthenticationCodeComputation( ) is a function that returns a 24 bit message authentication code, | indicates concatenation and blockID refers to a unique identifier identifying the Physical resource blocks (RBs), i.e., the time and frequency physical resources, used to transmit the data at MAC layer. The protocol flow is depicted in FIG. 16 and is as follows:

1. gNB broadcasts signed system information.
2. UE verifies the validity of the digital signature, verifying the SI. Note that this includes verifying whether the certificate has not expired. We assume that this does not require tight time synchronization.
3. UE generates symmetric-key K in a secure way. See note 2.
4. UE sends K to gNB in a secure way by encrypting it with the public key of gNB. UE also includes a nonce N_UE.
5. gNB confirms reception of K by sending the E(K, N_gNB|N_UE), i.e., the received nonce from the UE and a new nonce from the base station, encrypted with K. UE checks that the message contains N_UE. If it does not, the UE determines the presence of a MitM.
6. UE sends final confirmation message by sending the E(K, N_UE|N_gNB). gNB checks that the message contains N_gNB. If gNB does not receive this message or the check fails, gNB determines the presence of a MitM.
7. a. UE starts timer Ta after sending message 6.
   b. gNB starts timer Tb after reception of message 6.
8. a. UE activates C-CRC method using key K after sending message 6.
   b. gNB activates C-CRC method using key K after reception of message 6.
9. Standard protocol flow but protected with C-CRC. See Note 1.
10. a. If Ta>Tmax and message 11 has not been sent by the UE, it decides that a MitM is present and proceeds to search another base station. See Note 3 and Note 4.
    b. If Tb>Tmax and message 11 has not been received by the gNB, it decides that a MitM is present and drops the communication. See Note 3 and Note 4.
11. Final message sent by the UE that serves as implicit confirmation that no-MitM has been detected.
12. a. UE deactivates the C-CRC method after sending message 11.
    b. gNB deactivates the C-CRC method after receiving message 11.
13. Standard communication.

It is to be noted that a specific instantation of Messages 4, 5, 6, 7, and 9 may be as follows: Message 4 could be RRCSetupRequest; Message 5 could be RRCSetup; Message 6 could be RRCSetupComplete; Messages 9 might include the NAS handshake; Message 11 could be NAS Security Mode Complete. It is important to observe that the normal communication flow goes on as usual, with the only difference that C-CRC is active. Additionally, the MitM does not have access to K, and thus, it cannot compute the C-CRC correctly. Messages 4, 5, 6 ensure that the MitM cannot interfere in the activation of C-CRC.

Further, the C-CRC solution replaces the standard CRC at MAC layer. This means that if there is a MitM forwarding, modifying, or injecting messages (step 7), those messages will be dropped by UE and/or gNB. Not receiving messages in Step 7 means that message 9 will not be sent/received either, since the previous messages are missing, and thus, the timers Ta and Tb will timeout, and the UE joining procedure will be dropped. Thus, this solution achieves replay protection in all cases without requiring tight time synchronization, e.g., in the order of 1 or 2 miliseconds that would be required to avoid replay attacks in a reliable way.

Moreover, it is advantageous for the blockID to be unique to provide freshness. To this end, it can be constructed as follows blockID=Frame|Subframe|Slot|Allocated Resources TIME|Allocated Resources Frequency
   where | means concatenation and Allocated_Resources_Time and Allocated_Resources_Frequency determine the resources that are used for transmission in the given Frame/Subframe/Slot.

Since SFN has a period of 10.24 seconds, then this blockID construction sets a maximum value for Tmax. If Tmax is required to be longer, then a different blockID construction can be defined during normative phase.

Regarding the backwards compatibility, in the above design, new UEs run the C-CRC for a limited amount of time. After step 11, UEs run the standard CRC. The activation of C-CRC is negotiated in Steps 4 and 5 and the backwards compatibility table is as follows:

|  | Legacy UE | New UE |
|---|---|---|
| Legacy BS | As currently done. | Case nUE, IBS: UE learns from SIB and lack of signature that legacy BS does not support C-CRC. Thus, UE skips addition of E(K, PK) in message 4 and does not activate C-CRC. The base station does not activate C-CRC either and does not send E(K, N_gNB|N_UE) either. |
| New BS | Case IUE, nBS: Legacy UE does not look into signature since legacy UE does not know that field or new SIB is present. Legacy UE does not send E(K, PK) in message 4, and thus, gNB does not activate C-CRC and does not send Hash(K) in message 4. | As described with reference to FIG. 16 |

It must be considered that a MitM might try to use Case IUE, nBS and Case nUE, IBS to interfere and assemble a downgrade attack. Note that this downgrade attack is in respect the situation in which both UE and gNB support this solution. In the following, it is examined:

Downgrade attack using Case nUE, IBS: MitM can forward gNB's SIB as if it had no signature. If this happens, UE will not activate C-CRC and will not add E(K,PK). C-CRC will not be activated by UE or BS. This downgrade attack can be considered as acceptable since UE and gNB know that there is a risk (since C-CRC was not activated). UE and gNB can have a policy of not accepting connections that are FBS resilient.

Downgrade attack using Case 2: MitM removes E(K,PK), and thus, gNB does not activate C-CRC. Since gNB does not activate it, it will not send Hash(K) either, so that the UE will not activate C-CRC. As in the previous case, this downgrade attack can be considered as acceptable since at least UE and gNB know that there is a risk (since C-CRC was not activated).

It is to be noted that such downgrade attacks are also applicable to current solutions, and that in current solutions, a new UE might think that it is communicating with a proper gNB in a secure way (source origin verification and replay attack) and be under a replay attack.

The above exemplary embodiments are triggered by the reception of a signed SI, in particular, MIB/SIB1 broadcasted in a periodic fashion in 5G. However, SIB1 has a small size (less than 3000 bits) limiting the amount of information that can be added, in particular, the size of a digital signature or digital certificate. A solution to this is a new variant in which a UE, after reception of MIB/SIB1, asks in a proactive for a SIB, SIB_S to be specified, containing the signature. Once the UE has received SIB_S, the UE can verify that SI is originating from a given base station by using the trust anchor that has been installed. The UE can also verify the public key (PK) of the base station. The UE then uses this PK in step 4 as in above Figure triggering the rest of the protocol. In this case, Step 9 might consist of some pre-defined uplink and downlink messages.

Eventually, a requirement in all previous embodiments may be that this public-key, PK, can be used for both signature verification (of the SI, as required in Step 2) and for public-key encryption (as required in Step 4). If the public-key for signature verification of Step 2 cannot be used for PKE, the certificate sent in the SIB should contain an additional gNB's public-key for PKE in Step 4.

In further variants of the sixth embodiment, instead of signing the static parameters for the duration of 2"10 frames, i.e., 10.24 s, or till the SFN wraps around, the static parameters can also be signed for the duration of 2h54'45.76", i.e., till SFN and HFN wrap around. This reduces further the overhead on the Signature Generator. Further, the digital signing algorithm used to sign dynamic parameters can be based on a standard algorithm such as ECDSA but with a lower security level due to the short validity of the corresponding public-key. Alternatively, it can be a lightweight method, e.g., based on hash chains, Tesla.

The proposed combination of signatures provides also a good solution towards quantum-resistant signatures. Digital signatures are bulky in either public-key or signature size. The solution of the sixth embodiment allows using a heavy digital signature with a relatively low frequency. The dynamic fields need to be signed much more frequently, and for this, hash-based solution, that is also quantum-resistant, is a good candidate. Furthermore, the signing of dynamic fields can be done in the Signature Generator (DSnF) fitting the current DSnF architecture. But it can also be outsourced to the primary stations since the DSnF is signing all critical fields, including the starting time for SFN. There are clear advantages if the gNB signs the dynamic fields: the overhead on the DSnF is lower, signed information is available for broadcast on time.

This solution works as well if only a DSA is used. Thus, a DSA may be used to sign the static information during a long_interval of time. This signs also the Hash Chain anchor used by the primary station to sign dynamic fields. When this is done, the DSA should also be used to sign the SFN_HFN_Reference_time. A good trade-off is to have the DSA signing the new HC anchor, SFN_HFN_Reference_time, . . . HFN/SFN (2h54'45"). An alternative is every SFN period (10.24 seconds) having the drawback that the DSnF has to handle much more data requests. The rest of SIBs/MIBs are protected with a HC-based approach that is managed by each primary station.

Eventually, in this sixth embodiment of the invention, it was mentioned several times that the UE might be initially slightly out of sync or might not have the right time. If this happens and the UE has a slightly different time (e.g., 10 ms difference), the UE could only accept the message if it is received in 1, . . . , max_delay HFN/SFN later than expected. When this happens, the UE should start a secure time synchronization protocol with DSnF and check again whether the delays keep happening. If this is the case, the UE could be under a MitM relay node and should look for a different primary station.

In this embodiment, the protection against replay attacks is achieved by checking the freshness of the messages. This freshness is linked to the DSnF time that is centrally managed and the SFN that is base station specific. However, in certain occasions, it might be that a MitM attacker can act very fast, or that a certain system has to relax the time synchronization requirements. If this happens, the UE might receive two sets of system information with the same PCI and identical time. In this situation, an option is to reject both sets of SI and connect to a different base station. This is a known option that has the drawback that it can lead to DoS attacks (e.g., if a UE can observe a single base station) or can decrease the performance of the system (e.g., if the UE decides to connect to a base station that offers worse connectivity). A UE can also choose an alternative mechanism, namely, in the event that a UE has received two or more sets of SI with identical PCI and time, then the UE will choose the one that was received first since this is the one that is less likely, if feasible at all, to have been replayed.

Therefore, more generally, upon reception of a plurality of System Information messages from a plurality of primary stations, a further step could comprise rejecting all duplicated SI messages. Alternatively, a further step comprises selecting the less recent SI message and rejecting the remaining SI messages.

All the previously mentioned embodiments can be used in a single solution detailed in the seventh embodiment and linked to 5G. In accordance with the seventh embodiment, a cell scanning procedure is described to avoid FBSs and MitM nodes fitting in the DSnF framework. Its main features include:

Using information in the Physical layer distributed in the synchronization signal, together with the UE location, and known radiation pattern of base station for early detection of FBS, Using a performance-optimized combination of PKI and hash-chains to secure system information, namely MIB and SIB1, and where in one of the key embodiments the DSnF signs the anchors of hash chains, and the base stations use a hash chain approach to protect the system information, and UEs verify the signed information to avoid FBSs.

Providing optimizations to support efficient verification of fixed and variable fields improving the performance of the DSnF and system, verifying that the private key is allowed to sign messages in the current location of the UE to avoid attacks that compromise a private key in location A and use it to sign information in location B, verifying the freshness of the signed information, where the timing information is learned from multiple base stations or obtained through an initial handshake between UE and DSnF, to avoid simple replay attacks.

verifying that the signed SFN/HFN fits the current time avoiding in this way MitM relay attacks.

The cell scanning procedure to deal with FBS can include multiple optional steps as described below.

UE tunes to a specific frequency

UE tries to detect PSS, SSS, If UE fails to detect this, it goes to tune to next frequency Once UE successfully detect PSS/SSS, UE stores chosen SSB index and the corresponding signal strength Demodulation Reference Signal (PBCH DMRS)

[BS Location and PCI check based on physical signals] Based on UE's current location and SSB index and the strength of PBCH DMRS, the UE checks whether the estimated location of the BS matches the location stated in a trusted BSLog as in the fourth embodiment.

If there is a BS with unique PCI and its estimated location matches with the location in a known BSLog, the device accepts that BS.

If there is a BS with unique PCI but different estimated location than in the BSLog, the device places that BS at the end of the preference list.

If there are two BSs with identical PCI but different estimated location, and one of the locations does not match the BSLog, the device discards that BS.

If there are two BS with identical PCI and identical estimated location (e.g., if the UE does not use part of Solution 3; or the attacker targets UE), the device marks them as duplicated and moves forward in the process to check their signature and time.

UE tries to decode PBCH obtaining the MIB. Once UE successfully decoded PBCH, it tries to decode the PDCCH and PDSCH for RMSI and OSI.

[Verification of SI digitally signed] At this point of time, it can verify the digital signature of MSI that is broadcasted in SIB1 if the trust anchors are configured. If they are not configured, then the signature verification is skipped.

This is done as in the second embodiment above, where many fields are static. Those fields are verified only once. For later times, the only operation is to check whether their values remain unchanged. If this holds, the hash of the fixed fields is used as input and concatenated with the varying fields to verify the current signature.

The UE discards the BS if the verification fails.

Further, the UE discards the BS if the private key signing the message is not allowed in the area where the UE is located. The UE can obtain the signed location of the BS that is also broadcasted in a SIB and the BS is rejected if the location does not match the location where the UE is placed.

[Freshness check] This step in the cell scanning procedure relates to freshness verification according to the fifth embodiment.

[Relayed messages check] This step in the cell scanning procedure is done according to the sixth embodiment.

In the above embodiments, the Signature Generator has two public-key pairs to sign static and dynamic fields. In another embodiment, the primary stations are the entities owning these two key pairs.

In the above embodiments, one of the salient aspects is the need for synchronization between the various entities and in particular the primary station and the Signature Generator need to be synchronized, or they have to know the time difference. Indeed, the primary station has to broadcast the information. But the primary station needs to know "when" to do so to make sure that the Signature Generator time broadcasted in the signed SI of multiple base stations is in sync. If it is not, this can lead to a situation in which a primary station has a clock that ticks faster (and thus, its time is higher). Following the sync method in the description, a secondary station will use this time as reference. This can lead to the situation in which a secondary station rejects valid primary stations, maybe with a better transmission power leading to better connectivity, because of this reason.

Further, it helps preventing replay attacks. If the time is used avoid replay attacks, then it is important that the base station broadcasts accurate time. Otherwise, if the clock of a base station ticks faster (and then it is newer), it will broadcast the data a bit earlier, so that an attacker can replay the information.

Additionally, it is important to check the time consistency: In 3gpp TR33.809 Section 6.20.2.5.4 it is stated "when the digital signature from each cell is valid but the Time Counters recently received from multiple cells fail verification, the UE checks the consistency of the Time Counters from those cells. If they are close to each other, it indicates the UE time is out of sync with the network. If the Timer Counters are inconsistent, it indicates the presence of attacker (e.g., by replaying old information). In either case, UE can select the cell with the highest time counter, since a relayed time counter will highly likely not be the latest. If we choose to check the consistency of time counters received from multiple cells, we may not need to check the time counter against UE local time. This may allow to eliminate the need of time synchronization among all UEs and the network." In Section 6.20.2.5.5, the cell selection process is described. After scanning and removal of SI with duplicated PCI, it proceeds to acquire MIB, SIB and verify signature and freshness. From here, we can deduct that the current DSnF performs the time consistency check after removal of SI with duplicated PC's.

Moreover, as discussed above, a MitM relay node might be in range of the target UE, but the target UE might be too far from the real base station. However, some UEs in the area are likely to listen to both the MitM relay node and the real base station. Those UEs could to report the excluded SI (because of duplicated PCI) to the core network, or a base station once connected, so that the core network assesses the presence of a fake base station. If the core network assessment is positive, the core network might decide to inform the affected base station and take further actions, e.g., switch it off for a limited period of time.

In 3GPP TR33.809, Section 6.20.2.6.1 it is described how to deal with replay attacks. For local replay attack prevention, the removal of PCI information is used. For remote replay attack prevention, the text mentions the location. As described above, the removal of SI with duplicated information might not be enough because of the range extension attack that is described in which both the MitM and base station are relatively close to each other. However, something that can be added and signed in the broadcast message is the range of the base station. The range information together with the location of the base station can help to avoid, or at least mitigate, the above attack as well since it determines the area in which it is expected to receive SI from a given base station. In a extreme case, the base station can even broadcast the area where reception is expected.

Eventually, the current text in 6.20 says that MIB, SIB are signed. It is important to highlight that some fields are also signed although outside of MIB and SIB. For instance, the 4 LSB of SFN are not included themselves in the MIB.

Next to the cell specific parameters PCI and downlink frequency that are already suggested to be signed and verified by a UE, the following parameters transmitted in PBCH must be signed as well:

a) the SSB index must also be signed and checked. The SSB index is specific to a beam, and thus, it is not part of the MIB. If this information is not signed, an attacker might create a FBS with an "additional beam" broadcasting an additional SSB. The type of attack that is also feasible is such in which an attacker creates a fake beam with index, e.g., XYZ, in an area where the actual beam XYZ cannot be received. If this information is not signed/verified, an attacker can get data from a beam (that is broadcasted slightly earlier) and can place it in its fake beam (forging a real beam) that is broadcasted slightly later. Alternatively, the SI might be enhanced to sign the number of beams used by a base station and a UE might check the number of beams that a base station uses.

all SSB Subcarrier Offset bits, since 1 of them might be carried in PBCH. If this is not signed, an attacker might be able to modify the frequency offset.

half-frame bit (1-bit) must be signed. If the half-frame bit is modified, an attacker might have the wrong frame synchronization (5 ms error), e.g., MIBs might be located in the second half of the frame, instead of the first half of the frame.

MIB is not transmitted a single time, but multiple times, once per SSB. The reference time for SFN and MIB should be the time of the first SSB block received taking into account the half-frame bit.

The time window for accepting a message can depend on the distance between UE and base station, e.g., if UE knows its location and the location of gNB. In this case, when a UE receives a MIB at a given location, the UE can look up the location of gNB with that PCI, compute distance, and set a time window for accepting a message that depends on that distance by taking into account that radio waves propagate at the speed of light.

More generally, it can thus be advantageous to use a method of a secondary station checking the validity of a System Information message from a primary station, the method including checking the validity of the time of reception of the SI message, said step taking into account an estimate of a distance between the secondary station and the primary station. In an embodiment, this estimate of a distance requires the preliminary step of computing the distance based on the location of the secondary station and the location of the primary station. The location of the primary station may be obtained from a centralized reference server detailing the location and identifiers of primary stations.

In another aspect, it is proposed a method of a secondary station checking the validity of a System Information message from a primary station, the method including checking the validity of the time of reception of the SI message based on a time reference, wherein the time reference is adapted from a radiation beam (or SSB) index.

SFN serves as a time counter that is directly linked to the schedule of the base station and thus, it has advantages to sign it and/or consider it when checking the freshness of the timestamp. This refers to section 3.4.1 in S3-210541 and in particular, the fact that the current text says that if a signature/timestamp is repeated multiple times in multiple SIB1, then the allowed time window (t_w) is bigger, namely, the network delay t_d (which includes signing time, transmission time, propagation time, reception time, and signature verification time), a parameter tau to account for differences in the synchronization level between UE and base station, and a parameter t_s accounting for the scheduled delay because of the repetition of the same signature/timestamp in multiple SIB1, for instance, if the same timestamp/signature is used in N SIB1, t_s=(N−1)20. This approach minimizes the delay for processing, but it makes replay attacks very easy.

To deal with the situation this situation, if the same timestamp/signature is used for multiple SIB1 and UE does not want to make an error, UE should:

first step) look at the frame number in which the SIB1 is received SFN_received, and the relative position with the first time that the same timestamp/signature has been used (reference frame number). This can be derived as k=SFN_received % N where "%" is the modulo operation. With this information, the UE can correct the timestamp as (timestamp+k*20) and compare this value with the current time.

second step) since a FBS might modify the SFN (if the SFN is not signed), then the UE has to keep monitoring the received SIB1 till the next frame in which a new timestamp/signature is distributed. In this way, the UE can have guarantees that an attacker is not replaying frames longer than t_d+tau. Note that in any case, if the signature/timestamp is repeated, the UE still will have to wait in average t_s/2 till the UE gets a certainty of t_w=t_d+tau.

The timings for t_d are likely around 1 ms or a bit more. For instance: MIB is transmitted in 4 OFDM symbols with SCS=15 or 30 kHz. If 15 kHz, then MIB transmission takes 266 microseconds. If there are four beams, then the time difference between the first and fourth beam is almost 1 ms. Same at reception. This does not take into account SIB1 transmission and reception, and thus, the total transmission/reception time of MIB+SIB1 will be more than 266 microseconds. This is similar for the transmission delay. If we look at the time of arrival, the maximum value (in LTE) corresponds to ~0.6 ms.

Thus, in more generic terms, it can be proposed to use a method for signing consecutive messages, the method comprising reusing a single signature for multiple consecutive messages, wherein each message also includes a timestamp, the method further comprising computing an actual transmission timestamp from the received timestamp before checking the validity of the message.

Trust anchors should be linked to geographical areas. When a UE uses a trust anchor, the UE must check whether the trust anchor it is using is allowed in the location of the UE.

Hash chains can be a good solution if the anchor is distributed from a central entity and gNBs use hash chains instances to protect data broadcasted by the gNB. This is a very suitable solution taking into account the synchronous nature of 5G and the delivery of MIB/SIB1 messages. In particular, SIB1 would contain a MAC computed with the undisclosed link of the hash chain and the hash chain link that lets UEs to verify the previously received SIB1/MAC. SIB2/SIB5 messages can be distributed on demand. When TESLA is applied to those messages, these messages include a MAC computed with the next non-disclosed hash chain element, that will be disclosed in the next SIB1 message. The hash chain fits very well with the SFN schedule, see comment (4) above.

Instead of having to sign the whole 10-bit SFN, where the 6 MSB are transmitted in MIB and 4 LSB in PBCH, only the most significant bits might need to be signed. For instance, by signing the 8, 7, 6 MBS we get a time periodicity of 40, 80, 160 ms.

Regarding time synchronization issues: a general approach is that the UE uses timestamps from multiple gNBs to learn their time and find out whether it is out of sync. For this time consistency approach, it is required that gNBs are tightly synchronized. Furthermore, only timestamps whose signature has been verified must considered.

A second approach is to use the most recent time or the average of the verified timestamps.

A third approach for this to work is that a UE can request the current (DSnF/gNB) time. This is relevant is scenarios where UE's time may not be synchronized and/or there are too few gNBs around it. The UE sends request to DSnF and gets back current time.

Which approach to use (time consistency or directly retrieving the current time from the DSnF/gNB) and under which circumstances is determined by means of a policy. For instance, the time consistency checks can be still manipulated if an attacker controls enough fake base stations and the UE tries to determine from k timestamps whether all those values are consistent or not. If the information is broadcasted and signed, the UE might be same if there are less than ½ of compromised nodes, i.e., if there are k=2n+1 base stations (timestamps), if there are up to n fake base stations (timestamps). In other Byzantine models, the bound is k=3n+1 and then the system endures up to ⅓ of compromised values. For the second approach, the policy might contain the minimum number of timestamps that are required to use as the current time the highest timestamp. For instance, if a UE only has access to a timestamp, the policy might indicate that the UE should use the third approach and retrieve the time from the base station. The policy can also include how frequently the time accuracy should be cross checked. This might be e.g., at least, once per hour. The policy might also allow to use timestamps gathered at different instants of time, e.g. within a time window of for example 10 minutes.

Some existing solutions aim to ensure the authenticity of the System Information and deal with FBS/MitM. These solutions are based on a validity method for checking the validity of System Information messages comprising a secondary station receiving consecutive System Information messages, the secondary station generating a validation message based at least of the received System Information messages (or part of their respective contents), for verification.

In an example, the validation message is a hash of at least a subset of the received System Information messages.

In one solution, the validation message is sent by the secondary station to the primary station for verification over a secure channel. Alternatively or additionally, the validation message may be sent by the primary station to the secondary station for verification. The primary station might be a gNB or an network function in the core network.

Figure 17:
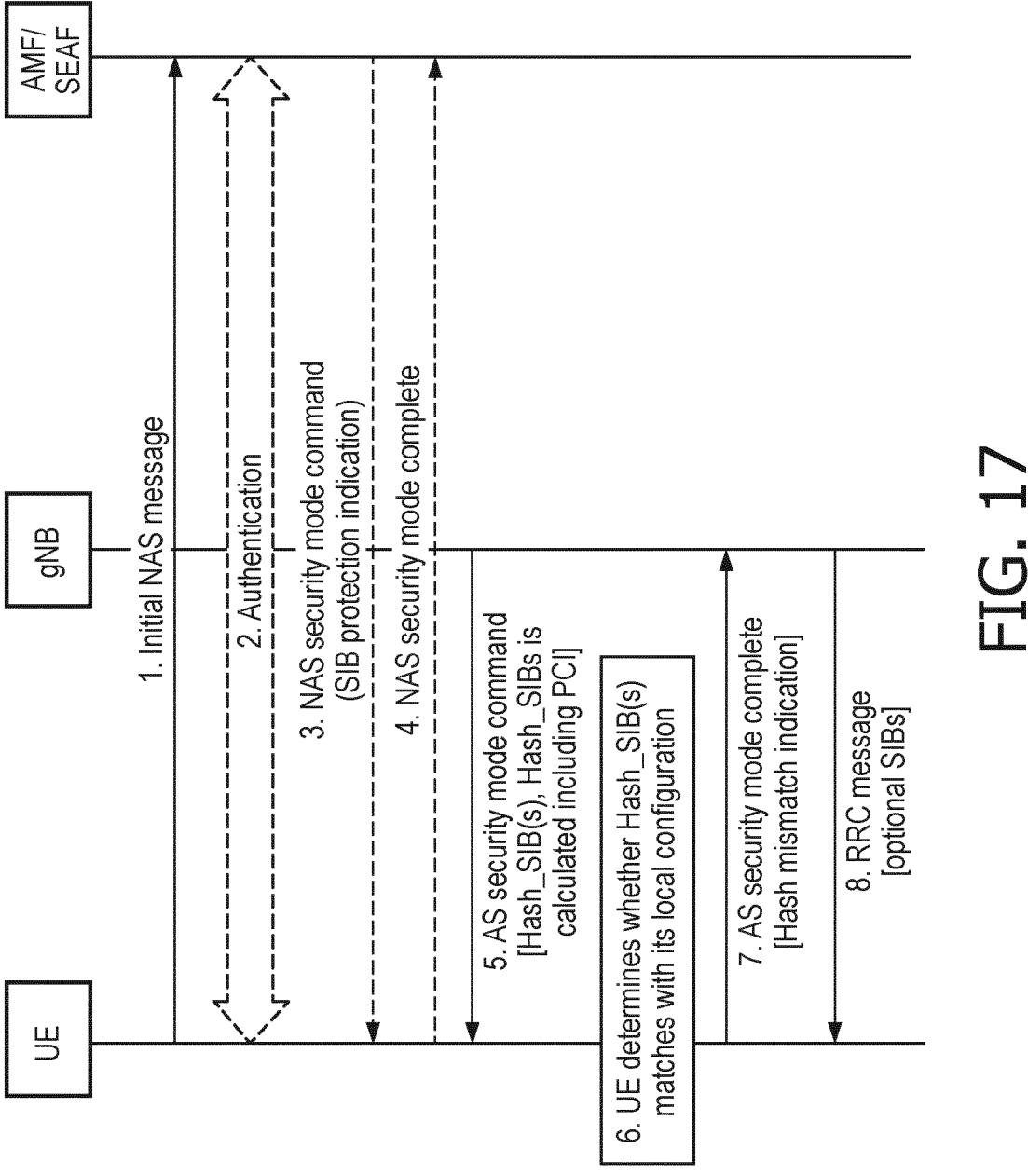
FIG. 17 is a flow chart representing protocol for a System information protection in accordance with still another embodiment of the invention.

In more details, these solutions thus consist in the gNB providing the hash of the MIB/SIB/PCI to the UE after it has established an AS security context. The UE can compare the information provided by the gNB with the MIB/SIB/PCI previously received, and check whether they match. If they do not, then it sends an indication to the gNB. This is, e.g., described in TR 33.809-0c1, Solution 19. FIG. 17 illustrates the protocol flow of a System information protection in Solution 19 in TR 33.809-0c1

In TR 33.809-0c1, a similar solution is described, namely solution 14, in which the UE is the entity sending the hash of the received MIB/SIB to the gNB. The gNB is the party checking whether the information matches (equivalent to step 6 in above FIG. 17). In other way, Solution 14 is like Solution 19 but with the roles of UE and gNB exchanged.

Such solutions have certain limitations:
a) Some fields in the PBCH that are broadcasted right next to the MIB are not included in the verification process. These fields include the SSB index, the SSB subcarrier offset bits, or the half-frame bits. The reason why this is a limitation is that it might be simple for an attacker to interfere with the communication. For instance, in 5G, a base station can broadcast the PCI/MIB in multiple SSBs, using multiple beams. If a base station is configured to use, e.g., only 2 beams, then an attacker can set an additional fake beam with a different SSB index. The attacker only needs to rebroadcast the actual MIB/SIB/PCI of the real base station through its fake beam using a very high power. In this way, the UE will think it is connected to the real base station since the check of MIB/SIB/PCI in Step 6 in FIG. 17 will be successful, but still be connected to a fake beam. Similar attacks might be feasible if the hash of the SSB subcarrier offset bits or the half-frame bits is not exchanged and verified. Note that setting an additional fake beam next to the real ones might be challenging since it requires configuring the transmission of the FBS so that the reception is synchronized at the reception, however, this is not infeasible at all as shown in related academic work.

b) These solutions claim to sign MIB/SIBs/PCI. However, the MIB includes the 6 most significant bits of the SFN. This means that there are 64 possible hashes to compare. This situation becomes even worse if it is also required to verify the SSB index.

c) These solutions do not prevent MitM.

In order to overcome these limitations in Solution 19 (and/or 14), it is proposed an improved validity method for checking the validity of System Information messages comprising a secondary station receiving consecutive System Information messages, sent by a primary station or a security entity linked to the primary station, the secondary station generating a validation message based at least of the received System Information messages (or part of their respective contents), for verification, wherein at least one of the alternatives is met: a System Frame Number is not included in the validation message generation, or only part of the System Frame Number is included in the validation message generation, or the System Frame Number is sent along with the validation message. Part of the SFN is some of the Most Significant Bits of the SFN. It can be for example the 6 MSBs of the SFN. Further alternatives are listed in the detailed description of these variants hereafter.

Thus, more specifically, the communication flow described in FIG. 1 can be improved as follows:

1) A first embodiment to deal with limitation a) consists in extending the communication flow depicted in FIG. 1 in such a way that the hash of PBCH fields is exchanged and verified. This includes the SSB index, the SSB subcarrier offset bits, or the half-frame bits. Note that the 4 least significant bits (LSB) of the SFN might also be included. However, this is not always needed, e.g., if the MIB is transmitted every 40 ms in frame numbers 0, 4, 8, . . . In such a configuration, those 4 LSB are always 0000.

2) A second embodiment to deal with limitation a) consists in checking whether the SSB index is active in the received SIB1. Here, we recall (see https://www.concepts-of-5g.com/2019/10/cell-synchronization.html) that SIB1 includes:

```
ServingCellConfigCommonSIB ::=      SEQUENCE {
    ...
    ssb-PositionsInBurst              SEQUENCE {
        inOneGroup                        BIT STRING (SIZE (8)),
        groupPresence                     BIT STRING (SIZE (8) OPTIONAL -- Cond FR2-Only
    },
    ssb-PeriodicityServingCell        ENUMERATED {ms5, ms10, ms20, ms40, ms80, ms160},
    tdd-UL-DL-ConfigurationCommon     TDD-UL-DL-ConfigCommon
OPTIONAL, -- Cond TDD
    ss-PBCH-BlockPower                INTEGER (-60..50),
    ...
}
```

Where ssb_PositionsinBurst indicates the beams that are active. A UE can check whether the SSB_index it has received is actually is set in this field, and that the hash of SI81 as provided by the base station matches the one computed locally based on the received SI81.

3) A third embodiment to deal with limitation b) consists in the gNB/UE keeping track of the SSB used by the UE (denoted SSB_UE) in the joining procedure and sending the Hash of MIB/PBCH computed using (i) the last MIB (SFN) broadcasted before message 5 and (ii) SSB_UE. The UE will use the last received MIB (and last received SFN) and the SSB used in the joining procedure.

4) A fourth embodiment to deal with limitation b) consists in sending multiple hashes, one per possible MIB value, and the UE checking all of them. The hashes could be linked to the specific values of SFN/SSB indexes used in their computation in order to make the search more efficient at the UE.

5) A fifth embodiment to deal with limitation c) is to use the Cryptographic CRC solution (or a solution such as the random scheduling) for MitM detection when the Hash of MIB/SI8 is exchanged.

For instance, if embodiments 1) and 2) above are applied to FIG. 17, then the resulting protocol can successfully defeat the attack described in limitation a) above in which an attacker sets a fake beam with an additional SSB index and forwards through it the SIBs/MIBs/PCI of the real base station. This is so because the base station will inform the UE about the beam (SSB index) that it used for the communication (through the hash value). If attacker used a different beam, the SSB index will be different, and the hashes will not match. Furthermore, this protocol is efficient since only requires sending the hash of the last MIB sent before sending message 5. This reduces communication and computation overhead.

We also note that some solutions in TR 33.809 propose to report the hash of MIB and SIB1 and other SIBs to enhance the measurement reports from the UEs as part of the extension of TS 33.501 appendix E. An example of such a solution is Solution #4 in TR33.809. The approach mentioned there has two drawbacks, which are also present in Solutions 14 and 19 in TR33.809. The first drawback is that Solution #4 requires computing the hash on the MIB/SIB1. But the MIB includes 6 (out of 10) bits of the SFN, the 6 SFN Most Significant Bits (MSBs). This will lead to 64 different "valid" hash values. A better alternative might consist in removing these 6 SFN bits from the MIB before computing the hash of MIB.

In some cases, it is wished to report the hash of MIB and the hash of SIB1 and the hash of SIB2 and so on. For instance, Solution #4 indicates that the multiple hashes might be exchanged. If the hash of MIB is sent, it should be done without the 6 SFM MSBs, as indicated above. How-ever, even this leads to some issues. The reason is that the MIB is just a few tens of bits while the output of the hash function SHA-256 is 256 bits long. Thus, transmitting the hash of the MIB is not efficient and in an alternative embodiment is preferred to exchange directly the content of the MIB, with or without SFN, so that the receiving party can verify the content directly. This is also applicable to other solutions, e.g., Solution 14 or 18 in TR 33.809 if the hash of MIB and SIB1 are computed separately.

If the SFN is included, the UE might report the hash of MIB/SIB1 AND the time when the MIB was measured. Note that the MIB only contains the 6 MSBs of the SFN and that each MIB is broadcasted multiple times, this can lead to a time uncertainty. To improve the time accuracy and allow the receiving party to discern which MIB the UE has received, the UE should report time when a new MIB was received, i.e., a MIB in which the 6 MSBs of the SFN differ from the 6 MSBs of the SFN in the previously received MIB. Alternatively, next to the time of the received MIB, the 4 LSBs of the SFN should be included. The network should then keep track of the MIB/SIB1 values used at a specific point of time by the real base station. This is feasible since the SFN repeats the values every 10.24 seconds. Thus, if a base station informs the core network about the SFN value at time t0, and optionally transmits the 64 valid hash values for MIB/SIB1 or provide information for the core network to deduce by computation the 64 hash values, the core network will know which SFN value is used by the base station at any time t, and which hash value of MIB/SIB1 should be reported. By doing this, the network can better identify which hash value should be used in the verification and detect attackers that spoof the identity of a valid base station by replaying its system information, but that are not fully synchronized. Similarly, and as explained in this description, 5G base stations can broadcast MIB/SIB1 through multiple beams pointing at different respective locations. The SSB index for each beam is included in the PBCH and identifies the beam. When a UE reports the hash of MIB/SIB1, the UE might also include in the computation of the hash an identifier of the directional beam (for example the SSB index, or an indication of an angle representative of the direction) for which the measured signal has the highest received power, in other words, the directional beam the UE has used in the communication link with the cell. If the UE does so, then in the report to the base station including the received hash of MIB/SIB1, the UE can include its location and time when MIB/SIB were measured. The base station (and core network once the base station informs the core network) knows the radiation pattern (i.e., direction of beams) possibly as a function of time, for example in the case where the beams are not fully static, the base station knows that at time t, the beams were aimed in a specific direction. With this knowledge, the base station (and the core network) knows which directional beam a UE should have picked up at a given location and time. Then, the core network can check whether the hash of MIB/SIB1 reported by a UE for a given time/location fits the one that the UE should have measured. We note that the core network might include a policy defining a temporal window wt and location window wl so that if the core network knows that at time t0 and location l0 a base station was using SFN_i and beam index Bi, then the core network might accept as valid the hash of MIB/SIB1 for (SFN_i−wt, . . . , SFN_i+wt) and B_i−wl, . . . , B_i+wl).

Figure 18:
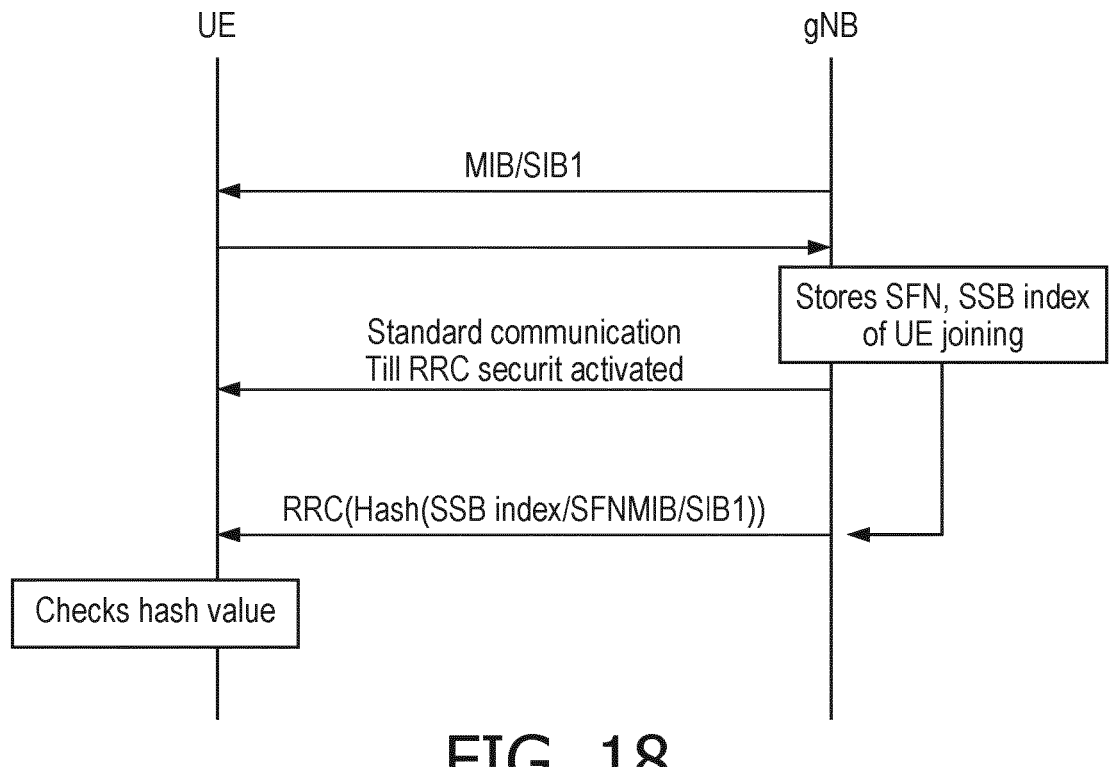
FIG. 18 is a flow chart representing protocol for a System information protection in accordance with still another embodiment of the invention.
Figure 19:
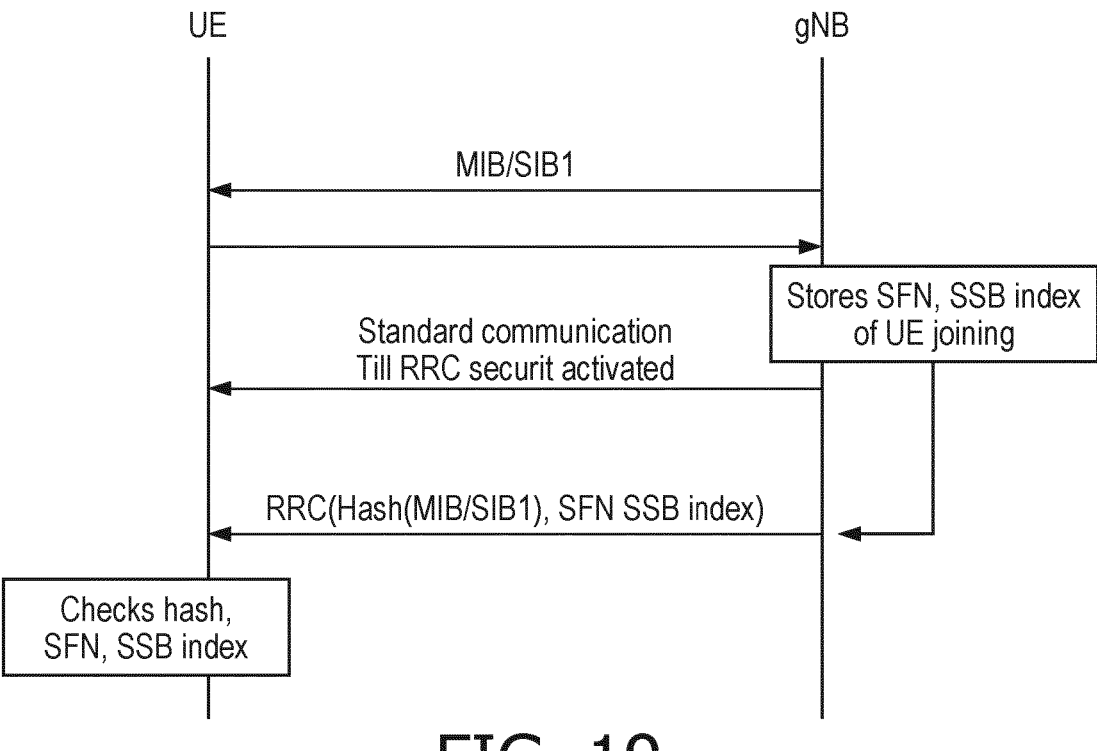
FIG. 19 is a flow chart representing protocol for a System information protection in accordance with still another embodiment of the invention.

It is to be noted that this additional information related to the timing and location described in the context of Solution #4 can also be incorporated to solutions #14 and #19 to increase the resistance of these solutions against replay attacks. In particular, in solution #19, the gNB provides the UE with the hash of MIB/SIB. When the gNB does so, the gNB can provide the UE for example through a secure RRC message with information about the hash of MIB/SIB that the UE should have received at a given time or location. For instance:

if gNB provides the UE with the 64 hashes of MIB/SIB1 (for the 64 possible values of MIB taking into account that MIB includes 6 bits of SFN) and a reference time, e.g., the time at which the hash for MIB/SIB1 with those 6 bits set to 0 was broadcasted for first time. The UE can check whether the received MIB/SIB1 followed/follows the same timing of the real base station as received in the secure RRC message. This check can help the UE to identify replay attacks if the timing of the fake base station is not tightly synchronized with the timing of the actual base station. This can be done by having a time window, e.g., 1 ms. The UE might classify a base station as a FBS if the timing is outside of that time window.

alternatively, the base station can include in the computation of hash MIB/SIB1 some fields of the PBCH, in particular, the SSB index and/or the least significant bits of the SFN. The base station can inform the UE through a secure RRC message about the hash of MIB/SIB1 computed using this information from the PBCH that the UE should have used/measured at its location. The base station can include this information next to the hash of MIB/SIB1. Note that this can require that the UE reports its location to the gNB in a secure way so that a MitM cannot modify it. Alternatively, this can require that the gNB can learn the position of the UE in a trustworthy manner without being influenced by the MitM. This is shown in FIG. 18.

alternatively, the base station computes the hash of MIB/SIB1 without including the SFN or any fields in the PBCH. The base station provides then in a secure RRC message with this hash and the expected SFN and PBCH fields, e.g., SSB index. Upon reception, the UE needs to check that all values are correct. This is shown in FIG. 19.

Figure 20:
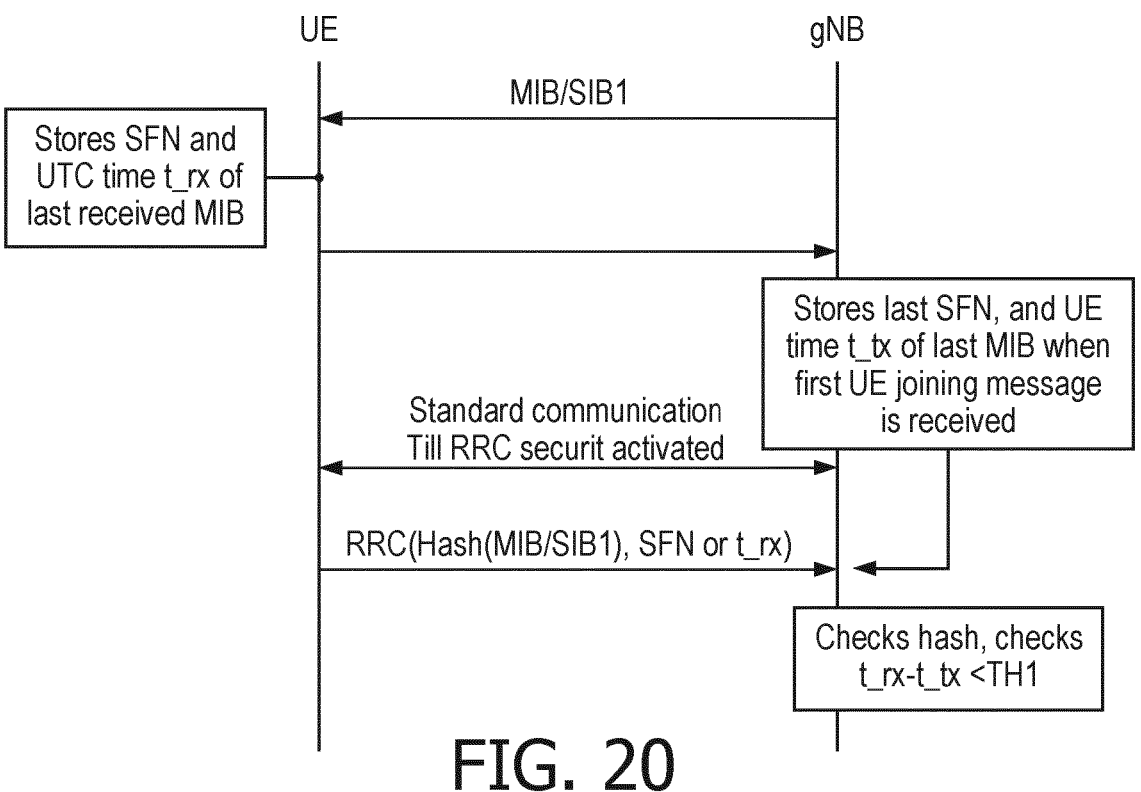
FIG. 20 is a flow chart representing protocol for a System information protection in accordance with still another embodiment of the invention.

Solution #14 is as solution #19, but in this case, the UE reports to the gNB the hash of MIB/SIB1. Following above description for #19, the UE can report to gNB in a secure way:

The hash of MIB/SIB1 including the time when the MIB was obtained and triggered its request to join the cell. Then, gNB can check whether the MIB/SIB1 received by the UE fits its timing schedule as done above for Solution #19. This can be checked by verifying that the SFN time measured by UE is the same as the one of the gNB. Note that this can also be done in terms of an absolute time reference, e.g., UTC time assuming that gNB and UE are synchronized. To this end, both UE and gNB keep track of the UTC time when the MIB was received/transmitted before the UE sends its first message to join a cell. Given these two times t_rx and t_tx, it is possible to subtract the reception time t_rx (measured by UE) from the transmission time t_tx of MIB/SIB1 (as measured by gNB) and verify whether it is greater than a threshold, e.g., TH1=1 millisecond. If t_rx−t_tx>TH1, then a MitM might be present. This is shown in FIG. 20. Note that gNB will receive information from many UEs, and thus, the base station can use the timing information from multiple UEs to better determine whether MIB/SIB1 are received later than expected with a higher accuracy. The gNB can do so by subtracting the transmission time of MIB/SIB1 (as measured by gNB) from the reception time of MIB/SIB (as measured and delivered by UEs) and averaging out those values. The averaging out operation removes noise if the noise has suitable properties, e.g., it is uniformly distributed and has average 0. This noise might be caused, e.g., due to UE clocks that are not perfectly synchronized. If this average value is over a given threshold, e.g., TH2=0.5 milliseconds, the base station can trigger an alarm about the presence of a MitM. The values of TH1 and TH2 can be configurable. We note that, in general, TH2 should be smaller than TH1. Note that if the clock of the base station is not sync, this will caused a constant error that is likely to trigger a MITM alarm. Thus, if a MITM is detected, the base station should check whether its time is synchronized to avoid this source of errors, and then take the final MITM detection decision.

Figure 21:
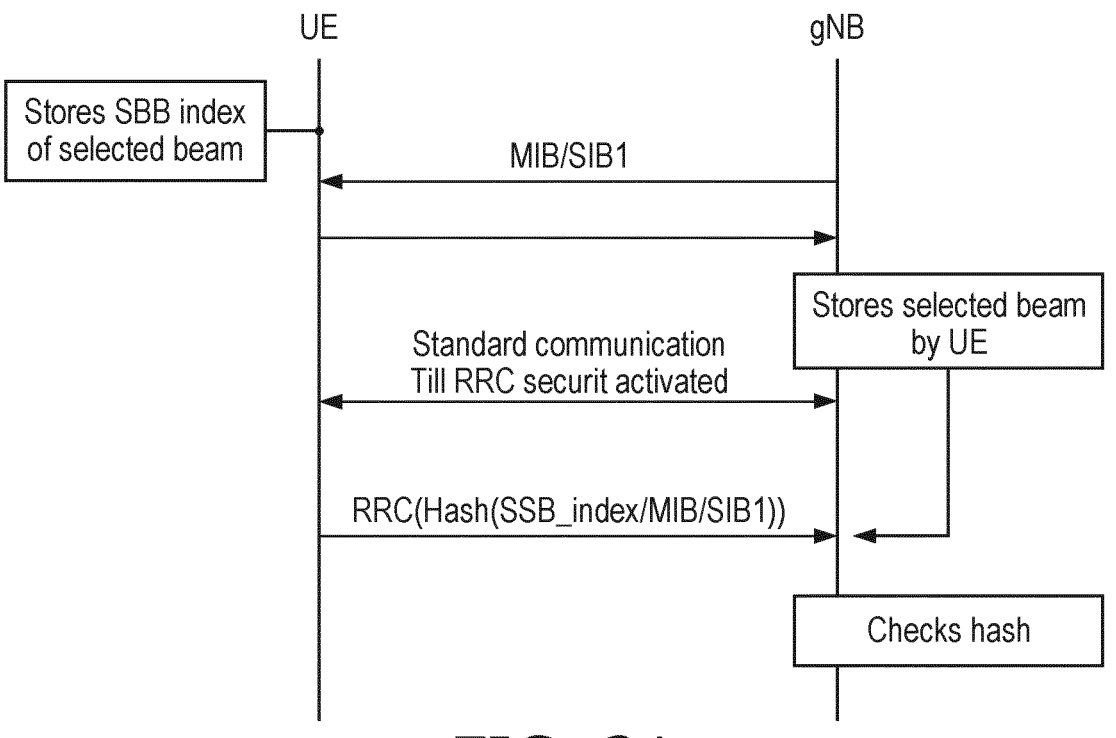
FIG. 21 is a flow chart representing protocol for a System information protection in accordance with still another embodiment of the invention.

The hash of MIB/SIB1 computed including SSB index present in the PBCH of the selected beam, i.e., the beam with the highest received power. Then, the gNB can check whether the SSB index corresponds to the same beam used when the UE joined the cell. This is shown in FIG. 21.

Figure 22:
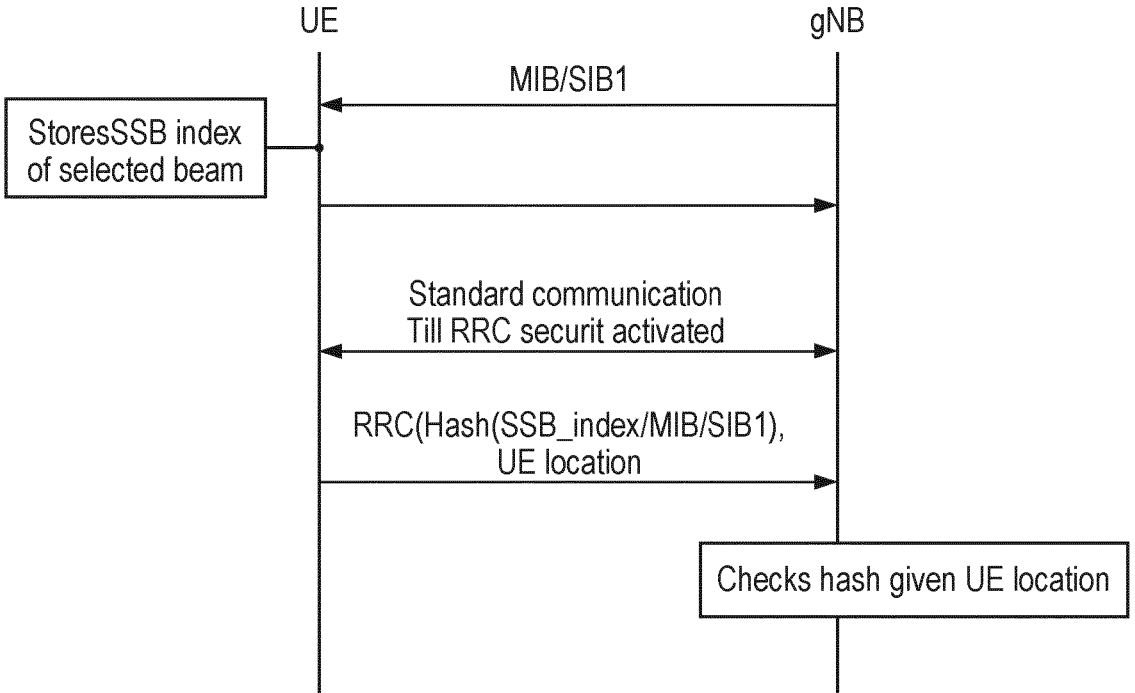
FIG. 22 is a flow chart representing protocol for a System information protection in accordance with still another embodiment of the invention.

Alternatively, the hash of MIB/SIB1 computed including SSB index and including the location of the UE when the UE measured that MIB/SIB1. Then, the gNB can check whether the received hash of SSB index/MIB/SIB1 corresponds to the MIB/SIB1 that the UE should have measured at that specific location and corresponding to the radiation pattern of the base station. For instance, knowing the UE location, the base station can know which SSB index the UE should have measured as the most powerful one, and then can use this SSB index to compare the received hash. This is shown in FIG. 22. Since the gNB receives multiple UE reports, the gNB checks not only whether the measurements are consistent with its own expected radiation pattern, but that those measurements are consistent with each other. We note that a base station can obtain the expected radiation pattern from a physical model or from measurements performed during initial network planning and deployment. Since the radiation pattern might be influenced by the construction of new buildings, vegetation (trees), etc, a base station can update its expected radiation pattern based on measurements reported by the UEs within a time window, e.g., the last 2 weeks. The radiation pattern at time t, RP(t), can be computed as a function of the radiation pattern at time t−1, RP(t−1), and the averaged measurements received at time t, AM(t). For instance, the RP can be updated as RP(t)=a*RP(t−1)+(1−a) M(t) where a is a memory factor. If a=0, then the system has no memory and the RP does not depend on the previous values. If a=1, then the radiation pattern does not change. We note that the radiation pattern can be influenced by other factors, e.g., rain. A base station can have multiple radiation patterns as above for different environmental circumstances.

The above embodiments described in the context of FIG. 18-22 allow the gNB to verify the SSB used by a UE to connect. In this way, the gNB or the network can check that no FBS/MitM attacker is using a fake beam with its system information to attract UEs. This fake beam attack has been denoted "stealthy MitM" attacker in the context of FIG. 23. If an attacker tries to launch the attack and the UEs only report in a secure way the beam that they perceive as the strongest/preferred one, then the gNB/network can detect the presence of the attacker by:

1) keeping track of the number of UEs (absolute or relative) connecting through each of the gNB's beams, and 2) monitoring changes in this distribution of UEs per beam compared with the normal situation.

When keeping track of the normal situation, i.e., the expected number of UEs (absolute or relative number) joining per unit of time, the gNB/network might update this normal/expected value at time t, denoted as "historical_n(t)", depending on both the UEs that join in the last unit of time (denoted as "current_n") and the previous historical n value. For instance, historical_n(t)=(1−a) current_n+a*historical_n (t−1) where a is between 0 and 1. This can be done per beam. The gNB can trigger an alarm if the UEs that joined in the last unit of time through at least a beam differs more than a given threshold (absolute or relative) from the expected value.

For instance, assume a gNB with 4 beams as shown in FIG. 23. Assume that UEs connect to the gNB through the 4 beams in a known (e.g., based on past data) manner, e.g., ~¼ of UEs through each beam. For instance, this might refer to the number of UEs joining through a beam in a time unit, e.g., 1 minute, 5 minutes, 1 hour. Note that this can depend on the time of the day, the day of the week, special events (e.g., a concert or a national holiday). Assume that at a given point of time a stealthy MitM attacker places a fake beam with SSB3 as shown in the figure where the FUE part of the stealthy MitM attacker connects to the gNB through gNB's SSB3 beam. When this happens, if the gNB checks the SSB used to connect, the gNB will notice that ¼ of the UEs join through SSB2, ¼ of the UEs join through SSB4, ~½ of the UEs join through SSB3. Since this distribution deviates from the expected distribution, the gNB/network triggers an alarm. Note that in the scenario in FIG. 23, the attacker has to join through SSB3 since otherwise the SSB check fails. This gives an indication of the presence of the fake beam.

Referring to the attack scenario in FIG. 23, the stealthy MitM attacker is likely to overshadow the weakest beam in a given area since (i) it is easier since the signal is weaker, (ii) attracts UEs more effectively towards the FBS/MitM, (iii) is less likely to be noticed by the gNB. If the attacker overshadows beam SSB3 as shown in FIG. 23, then the UE will use RACH occasions connected to fake beam SSB3. RACH occasions refer to the time and frequency resources that a UE can use to perform random access, e.g., as described in Tdoc R1-1611905 or described by M. Giordani et al. in "A Tutorial on Beam Management for 3GPP NR at mmWave Frequencies," available at https://arxiv.org/pdf/ 1804.01908.pdf. The UE will send its RACH preamble message in the time/frequency slots connected to beam with SSB3. The gNB monitors the RACH preamble slots associated with all beams, but since beam SSB3 of the gNB is not covering that area, the gNB is likely to miss UE's RACH preamble messages.

We note that in the scenario in FIG. 23—in particular, if SSBs used to connect are verified—then the attacker can try to apply the SSB attack in FIG. 23 by overshadowing the strongest beam at an area. In the case of FIG. 23, this corresponds to beam SSB1. If this happens, the gNB/ network and UE cannot detect the attack by checking the SSB index. However, the gNB/network/UE can monitor certain aspects to detect the attack.

If the attacker overshadows beam SSB1, then the attacker has to overshadow a stronger signal. That is not infeasible, but it will likely trigger more alarms when gNB/network/UE monitor SSB beams received with a too high signal strength compared with the expected value.

Assuming that the attacker overshadows SSB1 in a successful manner, i.e., without being detected due to its high transmission power, the UE will have to use RACH occasions connected to SSB1 as well. However, this might not be the best option for the attacker. The reason is that the real gNB is monitoring the RACH time/frequency occasions associated to beam SSB1, and thus, the gNB might receive the RACH preamble messages of the UE. If this happens, the real gNB can send a random-access response to the UE as well. Thus, a UE can monitor whether it receives multiple, e.g., two, random access responses. If this happens, then the UE will notice that something is wrong as well.

Similarly, assuming that the real gNB did not receive the PRACH message of UE, the real gNB might also be able to detect itself the Random Access Response from the FBS/MitM. The detection of an unexpected random access response by the real gNB also triggers an alarm.

The above might be monitored at the UE or the gNB/ network if the data is exchanged. For instance, the UE might send to the gNB/network the amount of received random access responses.

The attacker carrying out the attack described in FIG. 23 might focus on a given area. The reason is that the attacker has to synchronize its fake beam SSB with the SSB signal of the gNB it wishes to overshadow. If the area of attack is too wide, then the fake beam SSB might not be perfectly synchronized with the actual gNB SSB beam in some parts of the area under attack. If this happens, some UEs might not be able to decode the fake beam SSB perfectly or might be able to detect the presence of part of the original SSB frame. If this happens to a UE, the UE might reject such a SSB. The UE might also report this information to gNB or network so that this information is used to determine the presence of a FBS/MitM. This can be done, e.g., if the network receives multiple measurements from multiple UEs unable to decode correctly an SSB and/or detecting the presence of part of the original SSB frame.

The previous embodiments are described in the context of a UE connected to a gNB and aim at preventing the UE from connecting to a Fake Base Station. Similar scenarios in wireless standards such as 3GPP proximity services involve UEs acting as relays. In this case, a remote UE can connect to a gNB via a relay UE. Some embodiments are applicable to prevent remote UEs from connecting to fake relay UEs or MitM devices placed between the remote UE and the actual relay UE.

Thus, as seen in the previous embodiments, it is proposed a whole system to reduce the possibility of attacks based on False Base Stations or Man in the Middle. The components of this system include a secondary station, a Signature Generator and a primary station implementing one or more of the mentioned embodiments. The apparatus may be implemented by a program code means of a computer program and/or as dedicated hardware of the related devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method for a secondary station to obtain a time reference in a cellular network, the method comprising:

the secondary station at initial connection to the network sending a request for a time reference, said request being addressed to a Signature Generator, and wherein the request for time reference includes a randomly generated number used as a nonce;

receiving the time reference and the nonce, wherein the time reference and the nonce are signed with a nonce signature; and using the nonce and nonce signature to check authenticity of received messages, and using the received time reference to configure a clock at the secondary station;

receiving, by the secondary station, a plurality of system information (SI) messages from a plurality of primary stations, said SI messages including each a respective time reference information related to the corresponding primary station;

checking the validity of a received signature for each of the primary stations;

checking a cell identifier for each of the primary stations with a valid signature, and ignoring time reference information from primary stations with a cell identifier being identical to another primary station and having an earlier value than the one from the other primary station; and deducing a local time reference from one or more of the time reference information originating from primary stations with a valid signature.

2. The method of claim 1, wherein the time reference information is at least one of the following: a time offset representative of the difference between a clock value at the primary station and a clock value at a Signature Generator of the network, a clock value at the primary station, a clock value at the Signature Generator.

3. The method of claim 1, wherein the step of deducing a local time reference includes computing an average from a plurality of the time reference information originating from primary stations with a valid signature and without duplicate cell identifier with earlier time.

4. The method of claim 1, wherein the step of deducing a local time reference includes selecting the time reference information with the latest value originating from primary stations with a valid signature.

5. The method of claim 1, wherein the request is part of an Initial Radio Resource Communication, RRC, setup request message.

6. The method of claim 1, wherein the request is part of a Network Access Stratum (NAS) identity response message sent in response to a NAS identity request.

7. The method of claim 1, wherein the received signature is checked using at least one of the following algorithms: a Public Key Infrastructure (PKI) algorithm, a Boneh-Lynn-Shacham (BLS) signing algorithm, a Boneh-Gentry-Lynn-Shacham (BGLS) signing algorithm, an Elliptic Curve Digital Signature Algorithm (ECDSA), Falcon signing algorithm, Rainbow signing algorithm, a Great Multivariate Short Signature (GeMSS) algorithm.

8. A secondary station adapted for communicating in a network, the secondary station comprising:

a transmitter configured to send at initial connection to the network a request for a time reference, said request being addressed to a Signature Generator, wherein the request for time reference includes a randomly generated number used as a nonce;

a hardware receiver adapted to receive the time reference and the nonce, wherein the time reference and the nonce are signed with a nonce signature, a controller configured to use the nonce and nonce signature to check authenticity of received messages, and to use the received time reference to configure a clock at the secondary station;

wherein the hardware receiver is further adapted to receive a plurality of system information (SI) messages from a plurality of primary stations, said SI messages including each a respective time reference information related to the corresponding primary station;

wherein the controller is further configured to check the validity of a received signature for each of the primary stations, and to check a cell identifier at least for each of the primary stations with a valid signature, and ignore time reference information from primary stations with a cell identifier being identical to another primary station and having an earlier value than the one from the other primary station; and wherein said controller is adapted to deduce a local time reference from one or more of the time reference information originating from primary stations with a valid signature.

9. The secondary station of claim 8, wherein the time reference information is at least one of the following: a time offset representative of the difference between a clock value at the primary station and a clock value at a Signature Generator of the network, a clock value at the primary station, a clock value at the Signature Generator.

10. The secondary station of claim 8, wherein deducing a local time reference comprises computing an average from a plurality of the time reference information originating from primary stations with a valid signature and without duplicate cell identifier with earlier time.

11. The secondary station of claim 8, wherein deducing a local time reference comprises selecting the time reference information with the latest value originating from primary stations with a valid signature.

12. The secondary station of claim 8, wherein the request is part of an Initial Radio Resource Communication, RRC, setup request message.

13. The secondary station of claim 8, wherein the request is part of a Network Access Stratum (NAS) identity response message sent in response to a NAS identity request.

14. The secondary station of claim 8, wherein the received signature is checked using at least one of the following algorithms: a Public Key Infrastructure (PKI) algorithm, a Boneh-Lynn-Shacham (BLS) signing algorithm, a Boneh-Gentry-Lynn-Shacham (BGLS) signing algorithm, an Elliptic Curve Digital Signature Algorithm (ECDSA), Falcon signing algorithm, Rainbow signing algorithm, a Great Multivariate Short Signature (GeMSS) algorithm.

* * * * *